(12) United States Patent
Bohan

(10) Patent No.: US 12,209,431 B2
(45) Date of Patent: Jan. 28, 2025

(54) GRID FRAMEWORK STRUCTURE

(71) Applicant: Ocado Innovation Limited, Hatfield (GB)

(72) Inventor: Stephen Bohan, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 189 days.

(21) Appl. No.: 18/001,890

(22) PCT Filed: Jun. 11, 2021

(86) PCT No.: PCT/EP2021/065866
§ 371 (c)(1),
(2) Date: Dec. 15, 2022

(87) PCT Pub. No.: WO2021/254917
PCT Pub. Date: Dec. 23, 2021

(65) Prior Publication Data
US 2023/0265672 A1    Aug. 24, 2023

(30) Foreign Application Priority Data

Jun. 19, 2020 (GB) .................. 2009430

(51) Int. Cl.
*B65G 1/04* (2006.01)
*B65G 21/22* (2006.01)
*E04H 9/02* (2006.01)

(52) U.S. Cl.
CPC ........... *E04H 9/022* (2013.01); *B65G 1/0464* (2013.01); *B65G 1/0478* (2013.01); *B65G 21/22* (2013.01);
(Continued)

(58) Field of Classification Search
CPC .................. E04H 9/022; B65G 21/22
See application file for complete search history.

(56) References Cited

U.S. PATENT DOCUMENTS

| 3,638,377 A | 2/1972 | Caspe |
| 4,499,694 A | 2/1985 | Buckle et al. |

(Continued)

FOREIGN PATENT DOCUMENTS

| CN | 110145156 A | 8/2019 |
| EP | 2039958 A1 | 3/2009 |

(Continued)

OTHER PUBLICATIONS

First Office Action issued on Jan. 23, 2024, by the Japanese Patent Office in corresponding Japanese Patent Application No. 2022-578694, and an English Translation of the Office Action. (13 pages).

(Continued)

*Primary Examiner* — Rodney Mintz
(74) *Attorney, Agent, or Firm* — Buchanan Ingersoll & Rooney PC

(57) ABSTRACT

An anti-seismic grid framework system including a grid framework structure configured for supporting a load handling device operative to move one or more containers in a stack. The anti-seismic grid framework system includes a seismic isolation system for reducing seismic forces acting on the grid framework structure, wherein the grid framework structure is supported by the seismic isolation system, the seismic isolation system including a superstructure and a substructure, and at least one base isolation device disposed between the superstructure and the substructure such that the at least one base isolation device suppresses movement of the superstructure relative to the substructure in a seismic event.

30 Claims, 26 Drawing Sheets

(52) U.S. Cl.
CPC .. *B65G 2201/0235* (2013.01); *B65G 2207/20* (2013.01)

(56) References Cited

U.S. PATENT DOCUMENTS

| | | | |
|---|---|---|---|
| 4,593,502 A | 6/1986 | Buckle | |
| 7,249,442 B2* | 7/2007 | Pellegrino | A47F 5/0018 |
| | | | 248/564 |
| 8,484,911 B2* | 7/2013 | Zayas | E04H 9/021 |
| | | | 248/562 |
| 9,839,290 B2* | 12/2017 | Marino | B65G 1/02 |
| 11,299,901 B2* | 4/2022 | Allen | A47B 91/04 |
| 11,866,956 B2* | 1/2024 | Allen | B65G 1/02 |
| 2006/0174555 A1 | 8/2006 | Zayas et al. | |
| 2006/0237378 A1 | 10/2006 | Pellegrino et al. | |
| 2015/0374127 A1 | 12/2015 | Marino et al. | |
| 2018/0051764 A1 | 2/2018 | Wake et al. | |
| 2020/0011391 A1 | 1/2020 | Allen | |
| 2020/0232240 A1 | 7/2020 | Allen | |

FOREIGN PATENT DOCUMENTS

| | | |
|---|---|---|
| EP | 3412929 A1 | 12/2018 |
| GB | 2594559 A | 11/2021 |
| GB | 2594560 A | 11/2021 |
| JP | 2009228850 A | 10/2009 |
| JP | 2011021332 A | 2/2011 |
| JP | 2014101678 A | 6/2014 |
| JP | 2016138592 A | 8/2016 |
| JP | 2016176577 A | 10/2016 |
| JP | 2018021373 A | 2/2018 |
| JP | 2018090356 A | 6/2018 |
| JP | 2018533535 A | 11/2018 |
| WO | 2013036963 A2 | 3/2013 |
| WO | 2014122635 A1 | 8/2014 |
| WO | 2014160403 A2 | 10/2014 |
| WO | 2015019055 A1 | 2/2015 |
| WO | 2015025821 A1 | 2/2015 |
| WO | 2015185628 A2 | 12/2015 |
| WO | 2017081275 A1 | 5/2017 |
| WO | 2018150235 A1 | 8/2018 |
| WO | 2019101367 A1 | 5/2019 |
| WO | 2020224828 A1 | 11/2020 |

OTHER PUBLICATIONS

International Search Report (PCT/ISA/210) and Written Opinion (PCT/ISA/237) mailed on Oct. 1, 2021, by the European Patent Office as the International Searching Authority for International Application No. PCT/EP2021/065866.

Mishra et al., "Experimental and analytical study of unbonded and bonded scrap tire rubber pad as base isolation device", 2012, 15th WCEE, 10 pages.

Munoz et al., "Applicability Study of low-cost seismic isolator prototype using recycle rubber", Journal Tecnia, vol. 29, No. 2, 2019, pp. 64-73.

Office Action issued on Jun. 12, 2024, by the Canadian Patent Office in corresponding Canadian Patent Application No. 3,186,280. (4 pages).

Office Action (Combined Search and Examination Report under Sections 17 & 18(3) issued Feb. 3, 2023, by the UK Intellectual Property Office in corresponding GB Patent Application No. 2215843.0. (7 pages).

Office Action (Notice of Reasons for Refusal) issued on Sep. 17, 2024, by the Japanese Patent Office in corresponding Japanese Patent Application No. 2022-578694, and an English Translation of the Office Action. (8 pages).

* cited by examiner

GRID FRAMEWORK STRUCTURE

FIELD OF INVENTION

The present invention relates to the field of remotely operated load handling devices on tracks located on a grid framework structure for handling storage containers or bins stacked in the grid framework structure, more specifically to a grid framework structure for supporting the remotely operated load handling devices.

BACKGROUND

Storage systems comprising a three-dimensional storage grid structure, within which storage containers/bins are stacked on top of each other, are well known. PCT Publication No. WO2015/185628A (Ocado) describes a known storage and fulfilment system in which stacks of bins or containers are arranged within a grid framework structure. The bins or containers are accessed by load handling devices remotely operative on tracks located on the top of the grid framework structure. A system of this type is illustrated schematically in FIGS. 1 to 3 of the accompanying drawings.

As shown in FIGS. 1 and 2, stackable containers, known as bins or containers 10, are stacked on top of one another to form stacks 12. The stacks 12 are arranged in a grid framework structure 14 in a warehousing or manufacturing environment. The grid framework is made up of a plurality of storage columns or grid columns. Each grid in the grid framework structure has at least one grid column for storage of a stack of containers. FIG. 1 is a schematic perspective view of the grid framework structure 14, and FIG. 2 is a top-down view showing a stack 12 of bins 10 arranged within the framework structure 14. Each bin 10 typically holds a plurality of product items (not shown), and the product items within a bin 10 may be identical, or may be of different product types depending on the application.

The grid framework structure 14 comprises a plurality of upright members or upright columns 16 that support horizontal members 18, 20. A first set of parallel horizontal grid members 18 is arranged perpendicularly to a second set of parallel horizontal grid members 20 to form a plurality of horizontal grid structures supported by the upright members 16. The members 16, 18, 20 are typically manufactured from metal and typically welded or bolted together or a combination of both. The bins 10 are stacked between the members 16, 18, 20 of the grid framework structure 14, so that the grid framework structure 14 guards against horizontal movement of the stacks 12 of bins 10, and guides vertical movement of the bins 10.

The top level of the grid framework structure 14 includes rails 22 arranged in a grid pattern across the top of the stacks 12. Referring additionally to FIG. 3, the rails 22 support a plurality of load handling devices 30. A first set 22a of parallel rails 22 guide movement of the robotic load handling devices 30 in a first direction (for example, an X-direction) across the top of the grid framework structure 14, and a second set 22b of parallel rails 22, arranged perpendicular to the first set 22a, guide movement of the load handling devices 30 in a second direction (for example, a Y-direction), perpendicular to the first direction. In this way, the rails 22 allow movement of the robotic load handling devices 30 laterally in two dimensions in the horizontal X-Y plane, so that a load handling device 30 can be moved into position above any of the stacks 12.

A known load handling device 30 shown in FIGS. 4, 5a, and 5b comprising a vehicle body 32 is described in PCT Patent Publication No. WO2015/019055 (Ocado), hereby incorporated by reference, where each load handling device 30 only covers one grid space of the grid framework structure 14. Here, the load handling device 30 comprises a wheel assembly comprising a first set of wheels 34 consisting of a pair of wheels on the front of the vehicle body 32 and a pair of wheels 34 on the back of the vehicle 32 for engaging with the first set of rails or tracks to guide movement of the device in a first direction and a second set of wheels 36 consisting of a pair of wheels 36 on each side of the vehicle 32 for engaging with the second set of rails or tracks to guide movement of the device in a second direction. Each of the sets of wheels is driven to enable movement of the vehicle in X and Y directions respectively along the rails. One or both sets of wheels can be moved vertically to lift each set of wheels clear of the respective rails, thereby allowing the vehicle to move in the desired direction.

The load handling device 30 is equipped with a lifting device or crane mechanism to lift a storage container from above. The crane mechanism comprises a winch tether or cable 38 wound on a spool or reel (not shown) and a grabber device 39. The lifting device comprises a set of lifting tethers 38 extending in a vertical direction and connected nearby or at the four corners of a lifting frame 39, otherwise known as a grabber device (one tether near each of the four corners of the grabber device) for releasable connection to a storage container 10. The grabber device 39 is configured to releasably grip the top of a storage container 10 to lift it from a stack of containers in a storage system of the type shown in FIGS. 1 and 2.

The wheels 34, 36 are arranged around the periphery of a cavity or recess, known as a container-receiving recess 40, in the lower part. The recess is sized to accommodate the container 10 when it is lifted by the crane mechanism, as shown in FIGS. 5a and 5b. When in the recess, the container is lifted clear of the rails beneath, so that the vehicle can move laterally to a different location. On reaching the target location, for example another stack, an access point in the storage system or a conveyor belt, the bin or container can be lowered from the container receiving portion and released from the grabber device.

However, the grid framework structure is subjected to various external and internal forces. These include but are not limited to ground movement which can be attributed to the composition of the ground or soil type, forces developed by the movement of the load handling devices on the grid framework structure which can weight in excess of 100 kg, movement as a result of nearby constructions or moving vehicles such as trains or even during an earthquake or storm. It is paramount to keep the individual elements within the grid framework structure intact as a result of such external forces experienced by the grid framework.

To ensure stability of the grid framework structure, prior art storage systems are largely dependent on various supports and bracing arranged within or at least partly along the periphery of the grid. However, the use of various supports and bracing (anti-movement braces) to stabilise the grid framework structure from internal and external forces is disadvantageous for a number of reasons. The grid framework structure occupies space or area which could be utilised by the grid to store containers: in that it prevents optimum usage of available space or area for the storage of containers. The need of a supporting structure may limit the available options for positioning of the grid framework structure since any auxiliary grid supporting structure often requires connection to a surrounding structure such as the inner walls of a building and the requirement of a supporting structure that is not cost efficient.

WO2019/101367 (Autostore Technology AS) teaches a grid supporting structures for integration in a storage grid structure of an automated storage system arranged. The grid supporting structure is made up of four storage columns interconnected by multiple vertically inclined support struts. The storage column profiles has a cross-section comprising a hollow centre section and four corner sections, each corner section comprises two perpendicular bin guiding plates for accommodating a corner of a storage bin. The support struts has a width which allows them to fit in between two parallel guiding plates so as to not compromise the ability of the storage columns to accommodate a stack of containers or storage bins.

An alternative grid framework structure is thus required that minimises the impact of the available space or area for the storage of containers so as to provide a free-standing storage grid or at least requiring a less extensive auxiliary grid support structure.

Much of the world's population is located along seismic fault lines or in the paths of powerful storms such as hurricanes and tornadoes. Locating the grid frame structure in such areas are at risk of structural damage from seismic and storm events as the current grid framework structure may not hold the grid structure together. Powerful seismic and storm events may result in the failure of their structural integrity e.g. as a result in the inability of the structural fasteners to keep the grid firmly attached to the upright members. Earthquakes can be labelled into four categorises labelled as Type A, B, C, or D depending on the severity of the earthquake, whereby Type A is considered the least powerful earthquake and Type D is considered the most powerful earthquake. Type A-D can be graded by their spectral acceleration which is the maximum acceleration measured in g that an object, above ground level, will experience during an earthquake. Type D considered to represent the most powerful seismic event and typically, has a measured spectral acceleration in the region 0.5 g to 1.83 g (short period spectral response acceleration SDS see https://www.fegstructural.com/seismic-design-category-101/) and is the result of most failure of buildings. As powerful seismic events act on a structure, the three dimensional dynamic forces compromise the structural fasteners holding the grid framework structure together, causing them to work their way loose or out of the members in which they are embedded or, if they remain in place, they may tear their way through a structural fastener.

Many jurisdictions, such as the US states, have passed laws mandating that all new buildings, residential or commercial be constructed with certain seismic bracing features incorporated therein. A grid framework structure comprises internal bracing features incorporated within the grid framework structure whereby one or more of the upright members are braced together by one or more bracing members or bracing towers is shown in FIG. 8. Typically, the bracing members are distributed internally throughout the grid framework structure. The distribution of the internal bracing is largely dependent on the size of the grid framework structure, the ground condition and the environmental condition such as temperature. However, whilst the grid framework structure is able to withstand very low level seismic events having a spectral acceleration less than 0.3 g, presently there are no earthquake restraint system for a grid framework structure that is able to withstand more powerful Type C and Type C seismic events categorised by a spectral acceleration in the region of 0.5 g to 1.83 g.

An anti-seismic grid framework system is thus required that is able to withstand powerful seismic events.

This patent application claims priority from GB Application number GB2009430.6, filed on 19 Jun. 2020, the contents being herein incorporated by reference.

SUMMARY OF INVENTION

Whilst the current grid framework structure is able to withstand relatively small levels of ground movement usually less than 0.33 g spectral acceleration (short period spectral response acceleration SDS see https://www.fegstructural.com/seismic-design-category-101/), this cannot be said for ground movement in excess of 0.33 g that is usually representative of Type C and Type D seismic events. The joints linking the grid members and the upright columns together which are largely bolted together would tend to loosen and in an extreme case separate affecting the structure of the grid framework structure. Even though one or more braced towers can be incorporated amongst the upright columns to improve the stability of the grid framework structure, this may not be enough to maintain the stability of the grid framework structure in an event of a Type C and Type D seismic event. The present invention has mitigated the above problem by uncoupling or isolating the grid framework structure from its foundation. More specifically, the present invention provides an anti-seismic grid framework system comprising a grid framework structure for supporting a load handling device operative to move one or more containers in a stack, said grid framework structure comprising:

a series of intersecting grid members arranged to form a grid comprising a plurality of substantially rectangular frames in a horizontal plane, each of the substantially rectangular frames constituting a grid cell, said grid is supported by a plurality of upright columns at each of the intersections of the series of grid members to form a plurality of vertical storage locations for containers to be stacked between the upright columns and be guided by the upright columns in a vertical direction through the plurality of substantially rectangular frames, characterised in that:

the anti-seismic grid framework system further comprises a seismic isolation system for reducing seismic forces acting on the grid framework structure, wherein the grid framework structure is supported by the seismic isolation system, the seismic isolation system comprising an superstructure and a substructure, and at least one base isolation device disposed between the superstructure and the substructure such that the at least one base isolation device suppresses movement of the superstructure relative to the substructure in a seismic event.

The seismic isolation system decouples the grid framework structure from the horizontal components of the ground motion in a seismic event by inter-disposing at least one base isolation device having structural elements with relatively low horizontal stiffness between the superstructure and the substructure, i.e. the grid framework structure is uncoupled from uncontrolled horizontal movement of the ground. This gives the grid framework structure a fundamental frequency that is much lower than both its fixed-based frequency and the predominant frequencies of the ground motion. This shift of natural period causes a drop in spectral acceleration during a typical earthquake shaking.

The seismic isolation system comprises a superstructure, a substructure and at least one base isolation device disposed between the superstructure and the substructure such that the at least one base isolation device suppresses movement of the superstructure relative to the substructure in a seismic event. The superstructure comprises at least part of and, in some cases, all of the load-bearing structure of the grid framework structure. Equally, the substructure comprises at least the foundation of the grid framework structure.

For the purposes of this description, the terms "base isolation device", "base isolator", and "base isolator device" are used interchangeably.

Preferably, the at least one base isolation device comprises an elastomeric bearing comprising a laminated assembly of elastomeric layers disposed between an upper mounting plate and a lower mounting plate for respectively connecting to the superstructure and the substructure. For the purposes of this description, the terms "elastomeric layers" and "elastic layers" are used interchangeably.

The relatively low horizontal stiffness of the at least one base isolation device is provided by the elastic properties of the elastomeric layers. These could be natural and/or synthetic elastomers. In this case, the seismic isolation system, more specifically the at least one base isolation device dissipates energy by exploiting the elastic deformation of the elastomeric layers.

Preferably, the at least one base isolation device comprises an elastomeric bearing comprising a laminated assembly of alternating elastomeric layers and rigid layers, said laminated assembly is disposed between an upper mounting plate and a lower mounting plate for respectively connecting to the superstructure and the substructure. More preferably, the elastomeric layer comprises rubber and the rigid layer comprises steel such that the elastomeric bearing comprises a laminated assembly of alternating rubber and steel layers. The elastomeric layers provide lateral flexibility and elastic restoring force. The steel plates reinforces the elastomeric bearing by providing vertical load capacity and preventing lateral bulge. Upper and lower mounting plates connects the elastomeric bearing to the superstructure above the laminated assembly and the substructure below the laminated assembly.

Preferably, the elastomeric bearing further comprises:
an energy dissipating core disposed within the interior of the laminated assembly, said energy dissipating core is adapted to damp the vibration in a shearing direction of the laminated assembly by absorbing vibrational energy in the shearing direction of said laminated assembly, and
wherein the outer peripheral surfaces of the elastomeric layers and rigid layers is covered in an outer coating. The energy dissipating core provides damping by deforming plastically when the elastomeric bearing moves laterally in an earthquake. More preferably, the energy dissipating core comprises lead, tin, zinc, aluminium, copper, nickel, or an alloy thereof.

Optionally, the energy dissipating core extends between the upper and lower mounting plates. Preferably, the upper mounting plate is joined to an upper connection plate and the lower mounting plate is joined to a lower connection plate such that the laminated assembly is sandwiched between the upper connection plate and the lower connection plate. Preferably, the elastomeric bearing comprises a slider disc disposed between the laminated assembly and either the upper mounting plate or the lower mounting plate or both. More preferably, the slider disc comprises PTFE. The sliding friction of the slider disc against the upper mounting plate and/or the lower mounting plate provides a degree of damping of the elastomeric bearing for small or weak vibrations, e.g. to accommodate the high frequency vibrations.

In an alternative embodiment of the present invention or in combination with the elastomeric bearing, the at least one base isolation device comprises a sliding pendulum bearing or slide bearing comprising:
i) an upper bearing element having a first sliding surface,
ii) a lower bearing element having a second sliding surface, and
iii) a slider disposed between the upper bearing plate and the lower bearing plate such the slider is arranged to be in surface contact with the first sliding surface and the second sliding surface, the first sliding surface and/or the second sliding surface having a concave spherical surface with a specified radius of curvature such that the slider is arranged to slide along the concave spherical surface of the first sliding surface and/or the second sliding surface resulting in a lifting of the superstructure during seismic ground motion consistent with providing at least one sliding pendulum mechanism.

The sliding pendulum bearing employ at least one concave spherical surface and a slider which slide along the at least one concave spherical surface, resulting in a lifting of the superstructure during seismic ground motions. The lifting of the superstructure results in an equivalent pendulum motion. The radii of curvature of the concave surface result in an effective length of a pendulum arm that determines the dynamic natural period of vibration of the sliding pendulum bearing. The simplest sliding pendulum bearing is a single sliding pendulum bearing which consists of a spherical concave surface supporting a slider to provide a single pendulum mechanism. The sliding pendulum bearing can also include a double pendulum bearing which consists of two spherical concave surfaces and a slider disposed between the two spherical concave surfaces to provide two independent pendulum mechanisms and a triple pendulum bearing which consists of four spherical concave surfaces and three sliders that is arranged to provide three independent pendulum mechanisms. The behaviour of each of the double and triple pendulum bearings exhibit different hysteric properties at different displacement phases.

Preferably, the at least one base isolation device comprises a triple pendulum bearing comprising:
i) an upper bearing element having a downward facing concave spherical surface with a specified radius of curvature,
ii) a lower bearing element having an upward facing spherical surface with a specified radius of curvature, and
iii) a first slider having a convex spherical surface that is arranged to slide along the upward facing concave spherical surface of the lower bearing element and an opposing concave spherical surface having a radius of curvature substantially smaller than the radius of curvature of the upward facing concave spherical surface of the lower bearing element,
iv) a second slider having a convex spherical surface that is arranged to slide along the downward facing concave spherical surface of the upper bearing element and an opposing concave spherical surface having a radius of curvature substantially smaller than the radius of curvature of the downward concave spherical surface of the upper bearing element,
v) a third slider having an upper convex spherical surface that is arranged to slide along the concave spherical surface of the first slider, and a lower convex spherical surface that is arranged to slide along the concave spherical surface of the second slider.

The triple pendulum bearing incorporates three separate sliding pendulum mechanisms that are connected in series to support the same structural load. The increased number of pendulum mechanisms has the advantage of providing different pendulum mechanisms at different strengths of seismic motions. For example, each pendulum mechanism in a triple pendulum mechanism is activated at different strengths of seismic motions or intensities of earthquake ground motions.

To protect the interior surfaces of the sliders from contamination preferably, the triple pendulum bearing further comprises a means of connecting the first and second sliders together so as to allow independent pendulum mechanisms to be achieved from the sliding of said first slider against the lower bearing element and the sliding of the second slider against the upper bearing element. Optionally, the first slider and the second slider are connected together by a perimeter seal, e.g. an elastic seal.

The number of sliding pendulum mechanisms of a sliding pendulum bearing is dependent on the number of sliders operational between the spherical concave surfaces. A single slider operating against a single spherical concave surface will generate a single pendulum mechanism whereas three sliders operating between respective spherical concave surfaces will generate three pendulum mechanisms. The sliding pendulum mechanisms are connected in series in such a manner so that the different pendulum mechanisms become active at different strengths of seismic motions. This is achieved by providing different friction of coefficients for the different pendulum mechanisms. Once a respective friction coefficient is overcome, a slider is able to move on their respective spherical concave surface. This is repeated for the different pendulum mechanisms in a sliding pendulum bearing. The lateral travel is accompanied with a vertical movement of the superstructure that provide a restoring force.

Preferably, the sliding surface between the first slider and the lower bearing element has a first coefficient of friction and the sliding surface between the second slider and the upper bearing element has a second coefficient of friction, and wherein the first coefficient of friction is different to the second coefficient of friction. The configuration of the sliding pendulum bearing can be such that the first coefficient of friction and the second coefficient of friction provide optimised reductions in seismic forces acting on the superstructure, e.g. optimised increases in friction at increased displacement amplitudes of the substructure or ground movement. More preferably, the first coefficient of friction is less than the second coefficient of friction. For a given seismic motion, this allows the first slider to be activated, i.e. able to slide against the lower bearing element, before the second slider is activated.

Preferably, the sliding surface between the third slider and the first slider has a third coefficient of friction and the sliding surface between the third slider and the second slider has a fourth coefficient of friction, and wherein the third coefficient of friction is substantially equal or different to the fourth coefficient of friction. Optionally, the third coefficient of friction is less than both the first coefficient of friction and the second coefficient of friction. Equally, the fourth coefficient of friction is less than the first coefficient of friction and the second coefficient of friction. The third or inner slider allows the sliding pendulum bearing to dampen high frequency vibrations so as to prevent disruption of sensitive components of a storage system comprising the grid framework structure. The storage system include one or more load bearing devices operational on the grid and one or more containers stored with the grid framework structure. Damping the high frequency vibrations help to mitigate one or more load handling devices or bots from being de-railed from the grid or even toppling over and the spillage of the contents of the containers.

Preferably, the upper bearing element is fixed to the superstructure and the lower bearing element is fixed to the substructure. More preferably, the superstructure comprises a load bearing structure of the grid framework structure. Preferably, the substructure comprises a foundation of the grid framework structure. Optionally, the substructure comprises a well such that the at least one base isolation device is disposed in the well. This allows the grid framework structure supported by the superstructure to be at ground level. The distribution of the lateral forces in a seismic event and thus, the magnitude of the damping of the grid framework structure provided by the seismic isolation system of the present invention is dependent on the number and distribution of one or more base isolation devices between the substructure and the superstructure. The distribution of one or more base isolator devices can be tuned to remove any irregularities in the superstructure. Preferably, the at least one base isolation device comprises a plurality of base isolation devices disposed between the superstructure and the substructure, said plurality of base isolation devices are spaced apart in an array or grid like pattern of X metres by X metres, and wherein X is in the range between 1 m to 15 m. Optionally, the plurality of base isolation devices are distributed in an array of 6 meters by 6 meters, preferably, 3 meters by 3 meters. The spacing between the base isolation devices in the array is equally dependent on the size of each of the base isolation devices. Preferably, the width of each of the at least one base isolation device is in the range of substantially 150 mm to 500 mm. Preferably, the width of the at least one base isolation device is in the range of substantially 900 mm to 1200 mm.

Preferably, the at least one base isolation device is disposed between the superstructure and the substructure such that superstructure is vertically spaced apart from the substructure by a height of in the range of substantially 50 mm to 250 mm. The distribution and thus the spacing of the base isolation devices in the array is dependent on the size of each of the base isolation devices. For example, for a relatively large base isolation device having a width in the range 400 mm to 460 mm and a height in the range 190 mm to 210 mm, the plurality of base isolation devices can be arranged in grid like pattern having a large spacing between them, e.g. 12 meters by 12 meters. Conversely, for a relatively smaller base isolation device having a width in the range 150 mm to 250 mm and a height in the range 50 mm to 80 mm, the plurality of base isolation devices can be arranged in grid like pattern having a smaller spacing between them, e.g. 3 meters by 3 meters.

Preferably, the at least one base isolation device has a height in the range of substantially 320 mm to 350 mm.

Preferably, the at least one base isolation device comprises a plurality of base isolation devices disposed between the superstructure and the substructure, and the area density of the plurality of base isolation devices is in the range of substantially 0.005 to 0.015 devices per square metre. Optionally, the superstructure comprises a slab supported by one or more substantially horizontal beams. Optionally, the slab may comprise a composite steel/concrete slab. This combines the advantages of steel being strong under tension, and concrete being strong under compression, to form a composite structure that has excellent load-bearing properties.

Optionally, the seismic isolation system further comprises one or more plinths disposed between the at least one base isolation device and the superstructure and/or disposed between the substructure and the at least one base isolation device for increasing the vertical distance between the substructure and the superstructure. Additional space between the substructure and superstructure can be used for a range of different functions, for example to allow space for employee car parking at a fulfilment centre housing the anti-seismic grid framework structure.

Also, the additional space provides access underneath the superstructure, so is convenient for inspection and maintenance.

Further features of the present invention will be apparent from the detailed description with reference to the drawings.

DESCRIPTION OF DRAWINGS

Further features and aspects of the present invention will be apparent from the following detailed description of an illustrative embodiment made with reference to the drawings, in which.

FIG.

DETAILED DESCRIPTION

Figure 1:
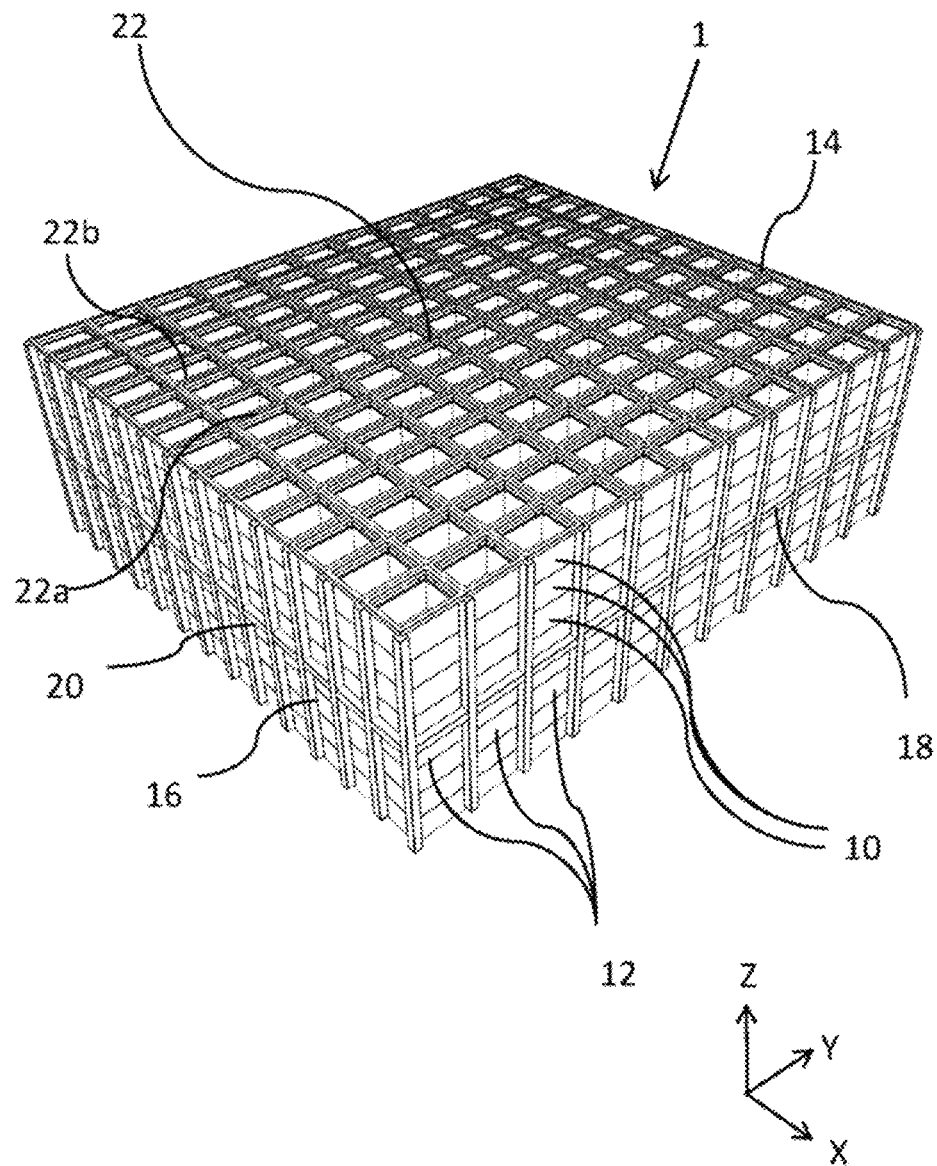
FIG. 1 is a schematic diagram of a grid framework structure according to a known system.
Figure 2:
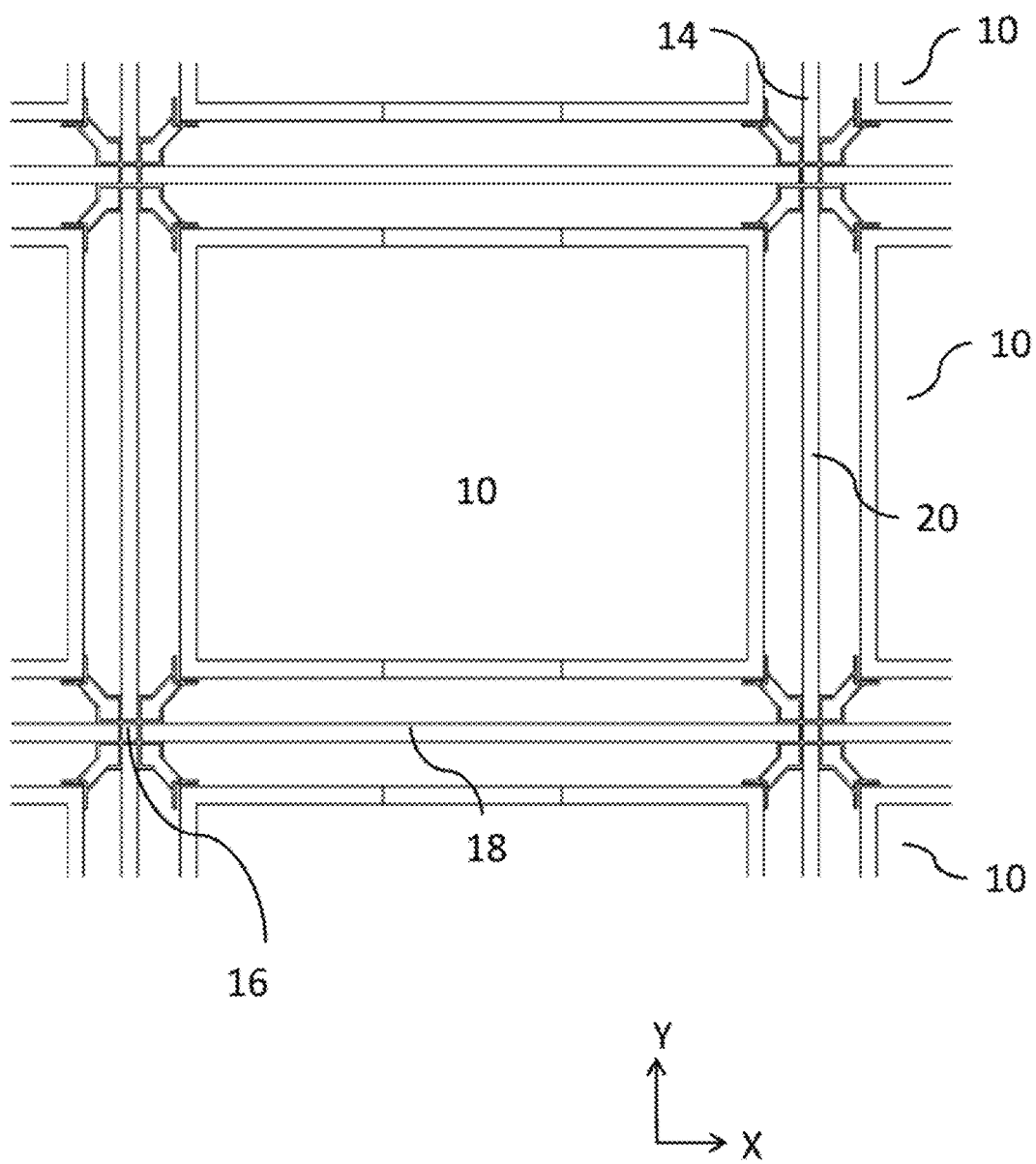
FIG. 2 is a schematic diagram of a top down view showing a stack of bins arranged within the framework structure of FIG. 1.
Figure 3:
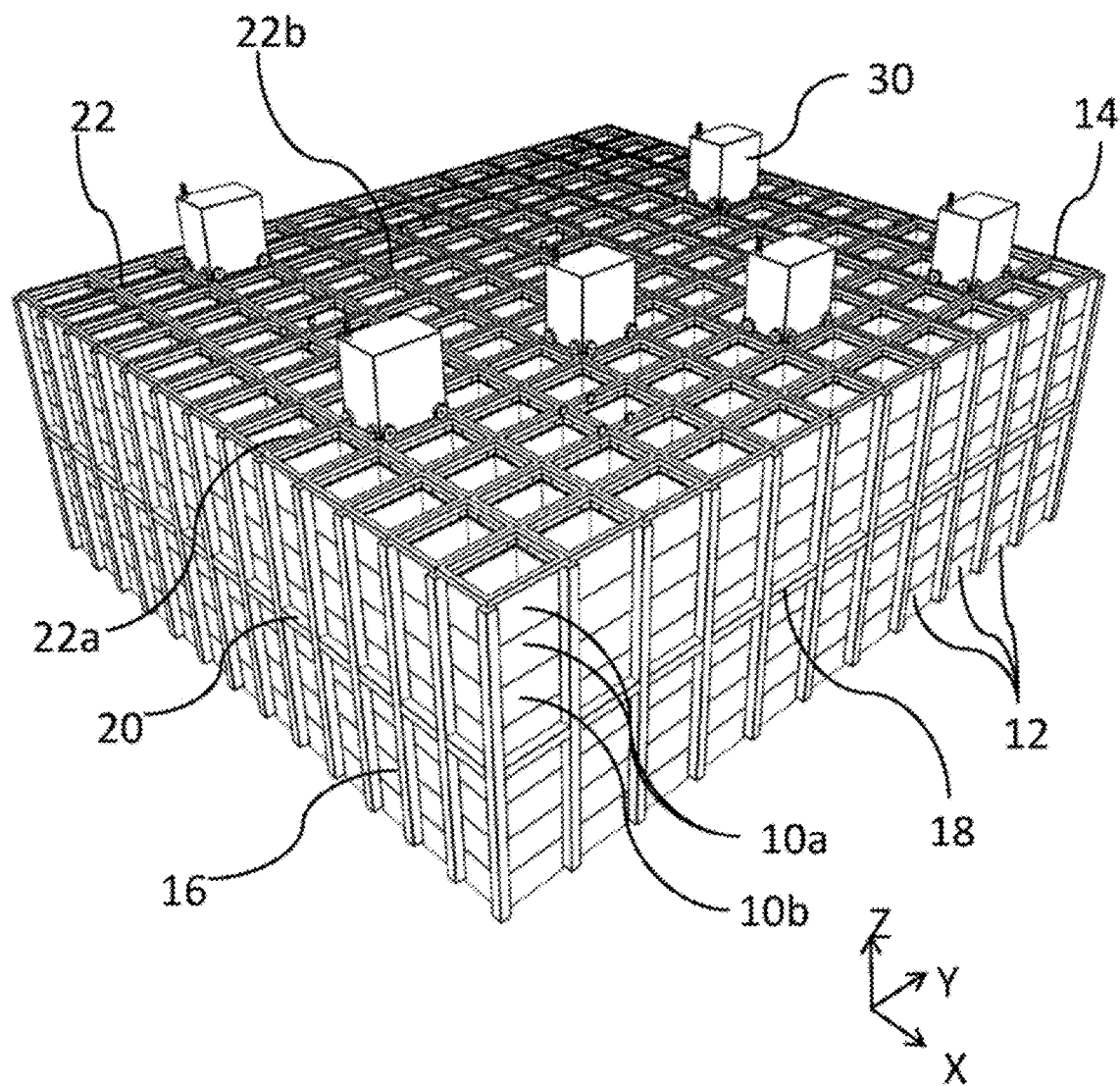
FIG. 3 is a schematic diagram of a system of a known load handling device operating on the grid framework structure.
Figure 4:
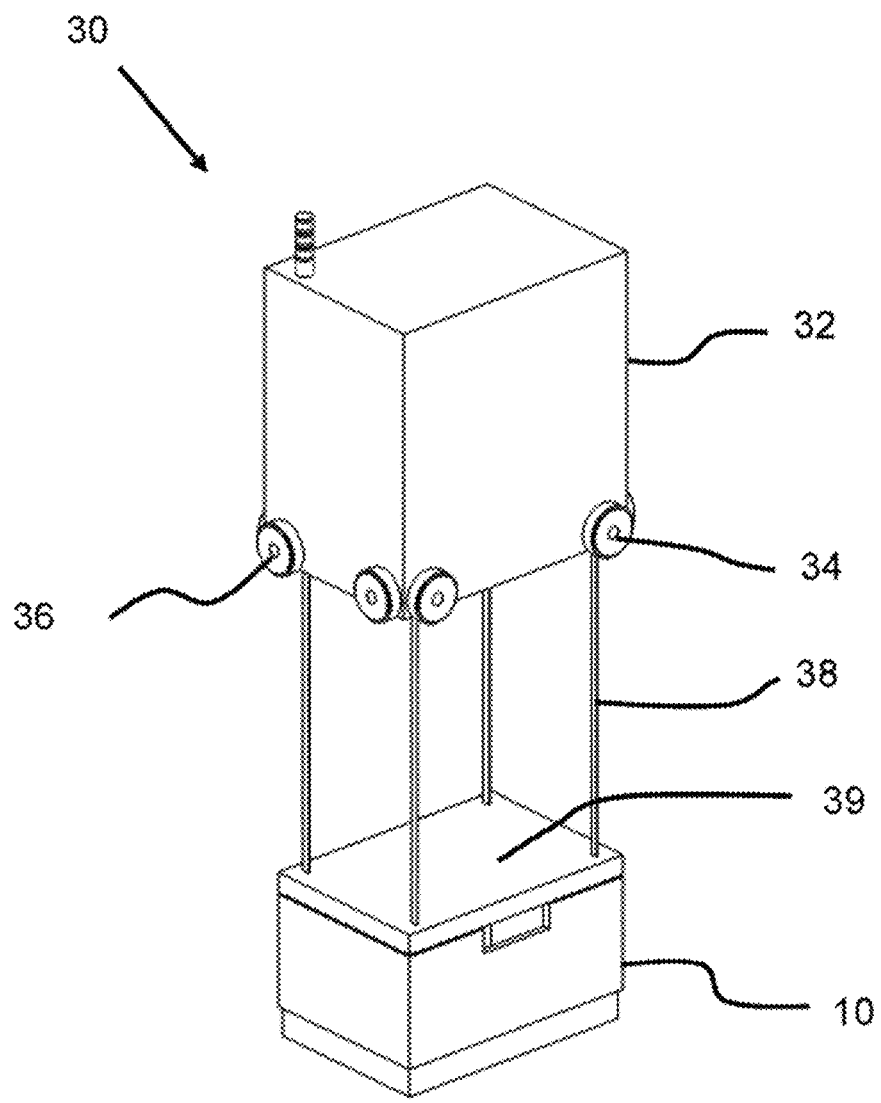
FIG. 4 is a schematic perspective view of the load handling device showing the lifting device gripping a container from above.
Figure 5A:
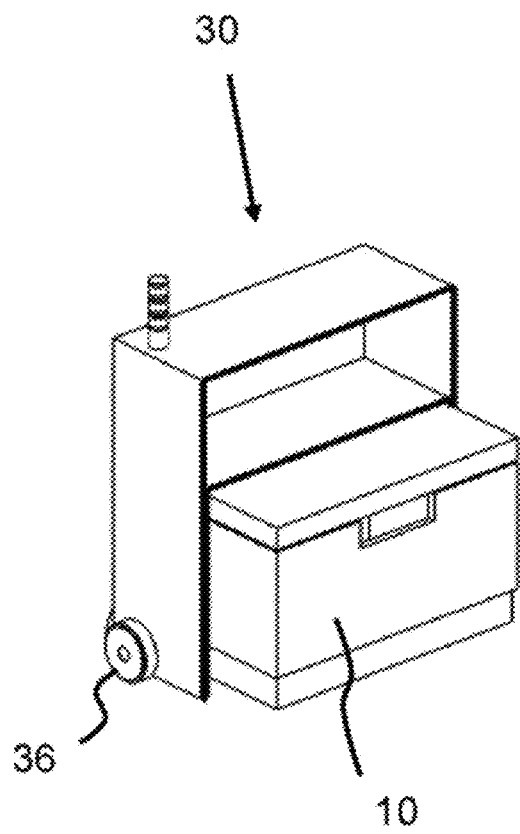
FIGS. 5a and 5b are schematic perspective cut away views of the load handling device of FIG. 4 showing (a) the container receiving space of the load handling device and (b) a container accommodating the container receiving space of the load handling device.
Figure 5B:
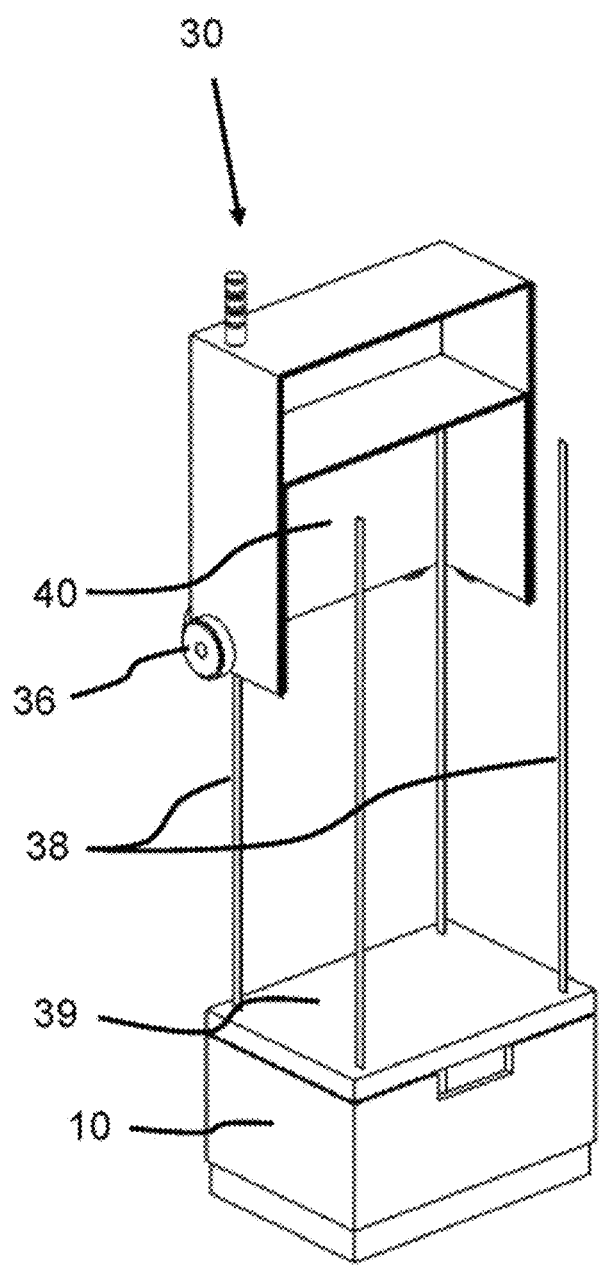
Figure 6A:
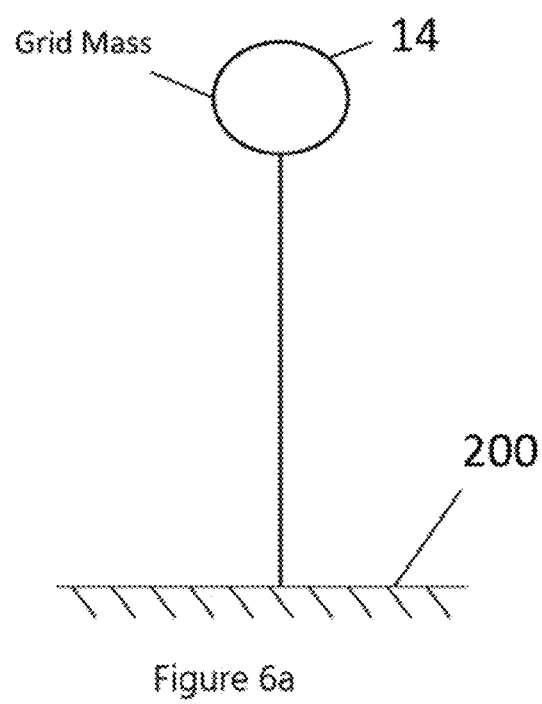
FIGS. 6a and 6b are schematic comparisons of expected lateral (mode) of vibration of (a) non-isolated model (left) and; (b) base isolated model (right).
Figure 6B:
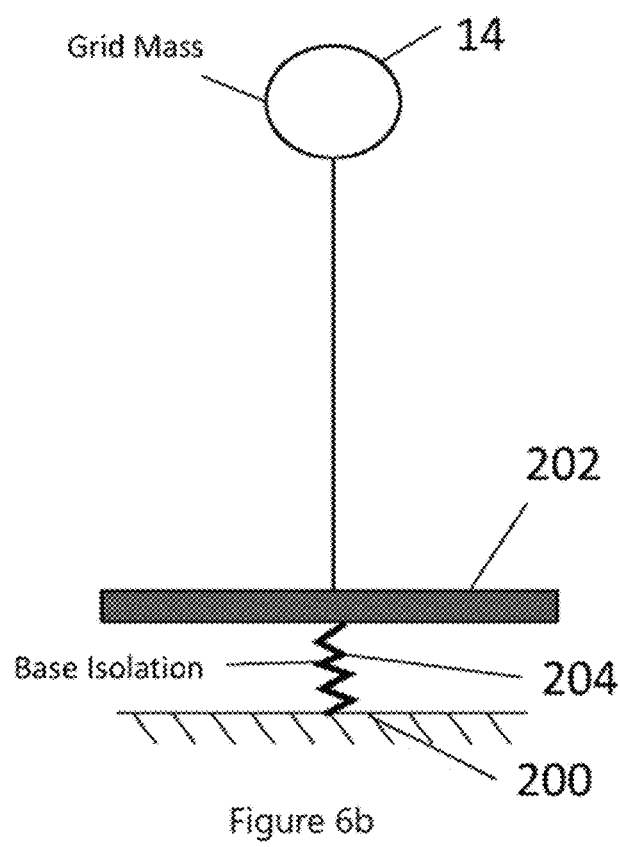
Figure 7:
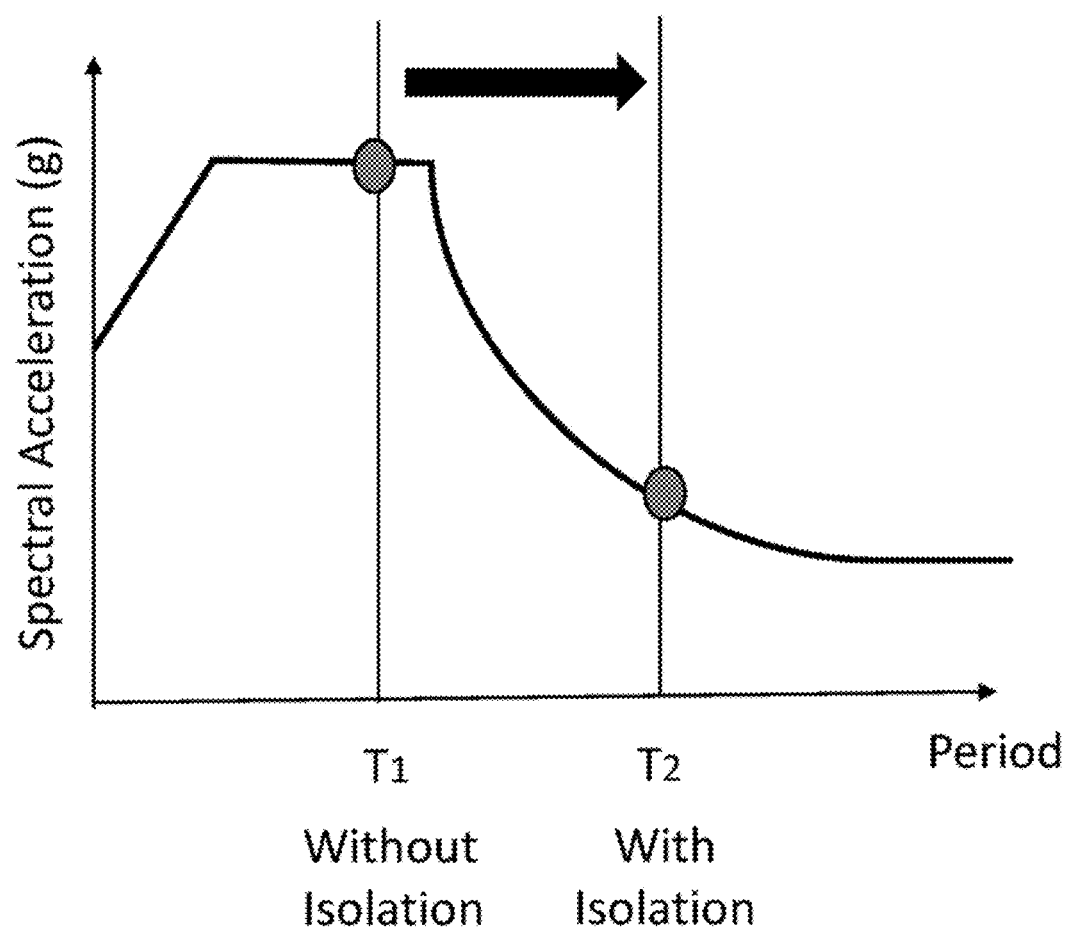
FIG. 7 is a schematic plot of an earthquake spectral acceleration response.

The present invention relates to a seismic isolation system for a grid framework structure 14 forming an anti-seismic grid framework system. The basic principles of the seismic isolation system can be envisaged by the lateral mode of vibration of a non-isolated model shown in FIG. 6a and isolated model shown in FIG. 6b. Typically, the grid framework structure 14 is rigidly mounted to a solid concrete foundation in the ground 200 which can comprise various solid rock soil sediments. Seismic waves produced during earthquakes comprise a wide range of frequencies. While the energy of the waves with higher frequencies tends to be absorbed by solid rock soil, the waves with low frequencies (having periods larger than one second) pass the solid rock soil without being absorbed but are eventually amplified by soft sediments. Without any form of decoupling of the grid framework structure 14 from the ground 200, the seismic waves and thus, seismic forces are transmitted through the solid concrete foundation resulting in structural damage or deformation to the grid framework structure, i.e. the floor shear force is large. The lateral forces generated by the seismic waves causes shaking of the grid framework structure which may cause the load bearing device operative on the grid to derail from the grid. Base isolation is an anti-seismic design strategy than can reduce the effect of earthquake ground motion by uncoupling the grid framework structure from its foundation. As shown to the right of FIG. 6b, the grid framework structure 14 is decoupled from the horizontal components of the ground motion by interposing structural elements with low horizontal stiffness between the foundation and the grid framework structure. As shown in FIG. 6b, the grid framework structure 14 is mounted to a superstructure or diaphragm 202, e.g. reinforced concrete slab, and the superstructure is raised above the ground by one or more base isolator devices 204. This gives the grid framework structure a fundamental frequency that is much lower than both its fixed base frequency and the predominant frequencies of the ground motion. This shift of natural period causes a drop in spectral acceleration for the typical earthquake shaking and the resultant forces on the structural and non-structural elements of the grid framework structure which are significantly reduced. The relationship of the spectral acceleration on the period to complete one cycle of seismic wave is best illustrated by the schematic plot shown in FIG. 7. As can be illustrated in FIG. 7, as the period becomes longer and the damping is increased, the spectral acceleration is reduced. Thus, the seismic force, i.e. the floor shear force becomes small. For the purpose of the present invention, the ground is referred to as a substructure. There are various types of base isolation devices to decouple the grid framework structure from the ground motion as a result of earthquakes and thereby, preventing large deflections being transferred to the grid framework structure. These include but are not limited to elastomeric based bearings, sliding bears. The effect of the seismic isolation system on the grid framework structure is best explained by first discussing the components making up the grid framework structure. This will help understand the areas of the grid framework structure that a vulnerable to seismic forces.

Grid Framework Structure

Figure 8:
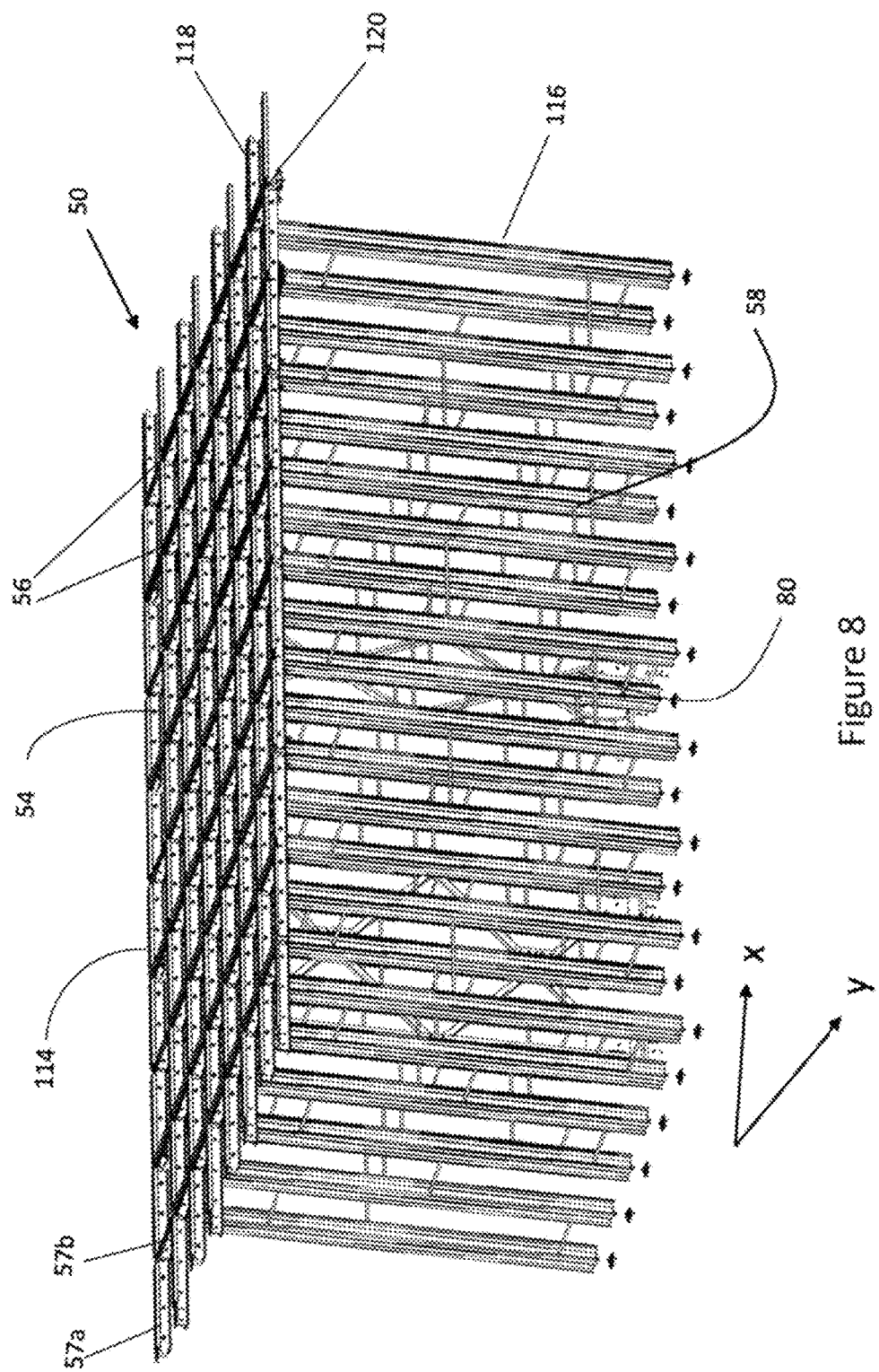
FIG. 8 is a perspective view of the grid framework structure according to an embodiment of the present invention.
Figure 9:
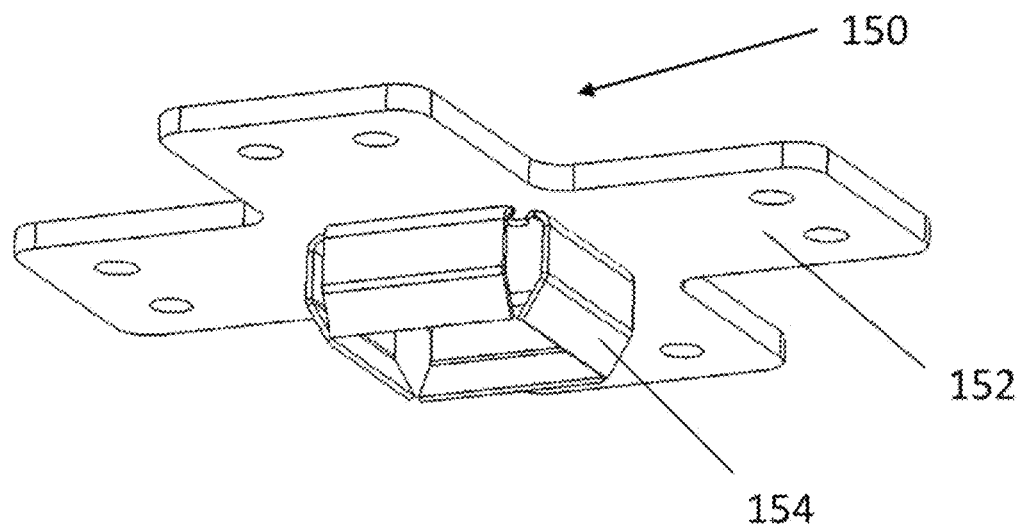
FIG. 9 is a perspective view of the cap plate for joining adjacent grid elements at the intersections according to an embodiment of the present invention.
Figure 11:
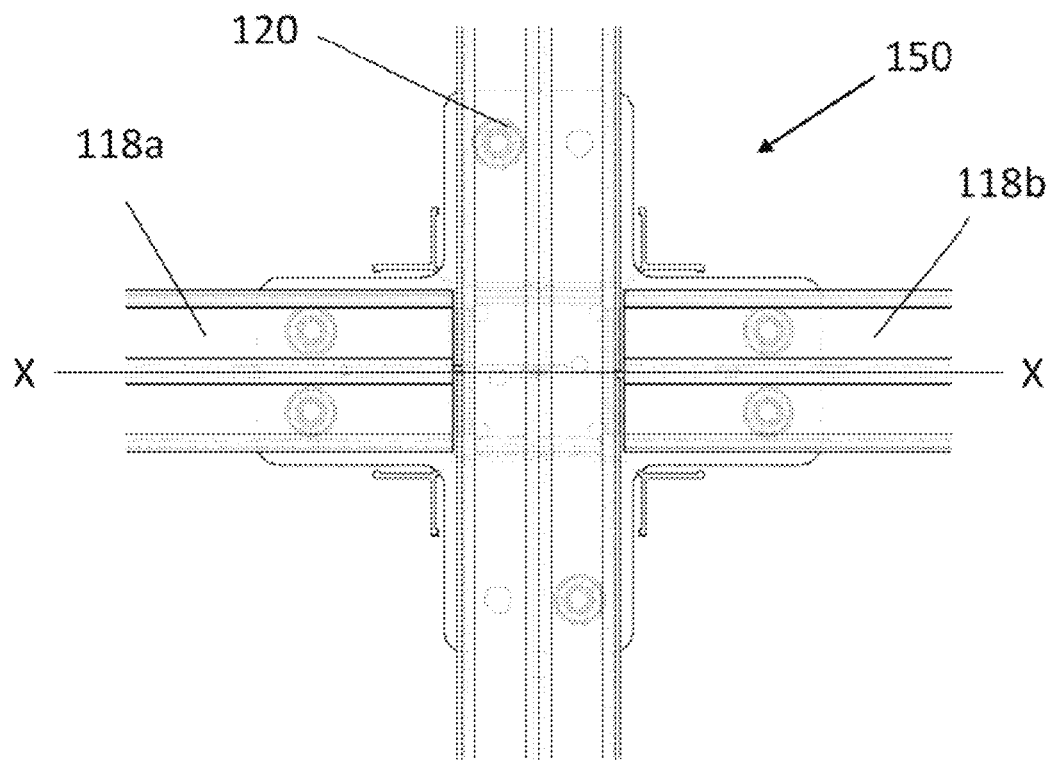
FIG. 11 is a perspective view of the cap plate linking adjacent grid elements at the intersections by connecting a centre section of a grid element and an end of an adjacent grid element according to the embodiment of the present invention.
Figure 12:
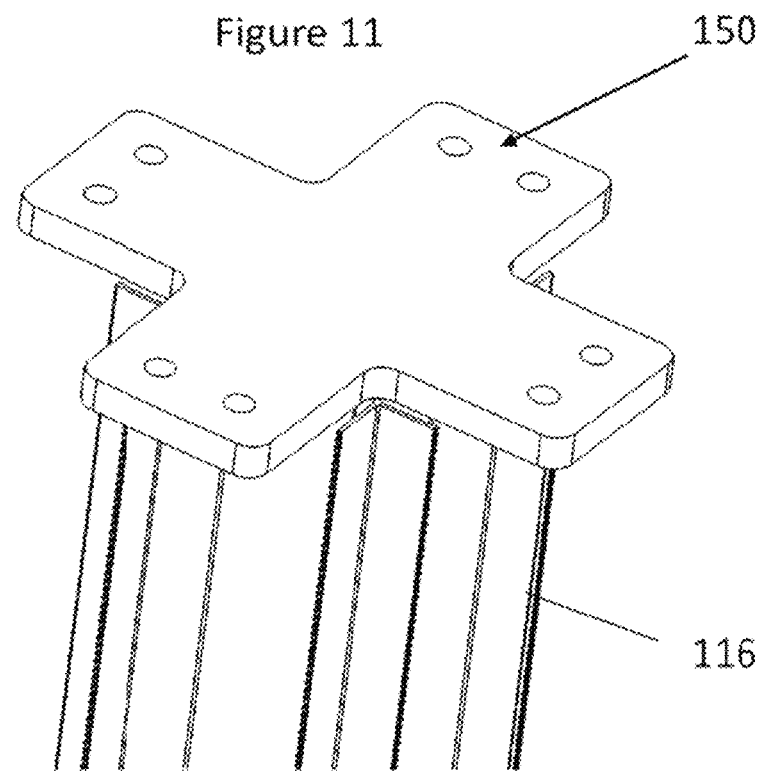
FIG. 12 is a perspective view of the cap plate fitted to an upright column for connecting adjacent grid elements together at the intersection where the grid elements cross according to an embodiment of the present invention.
Figure 13:
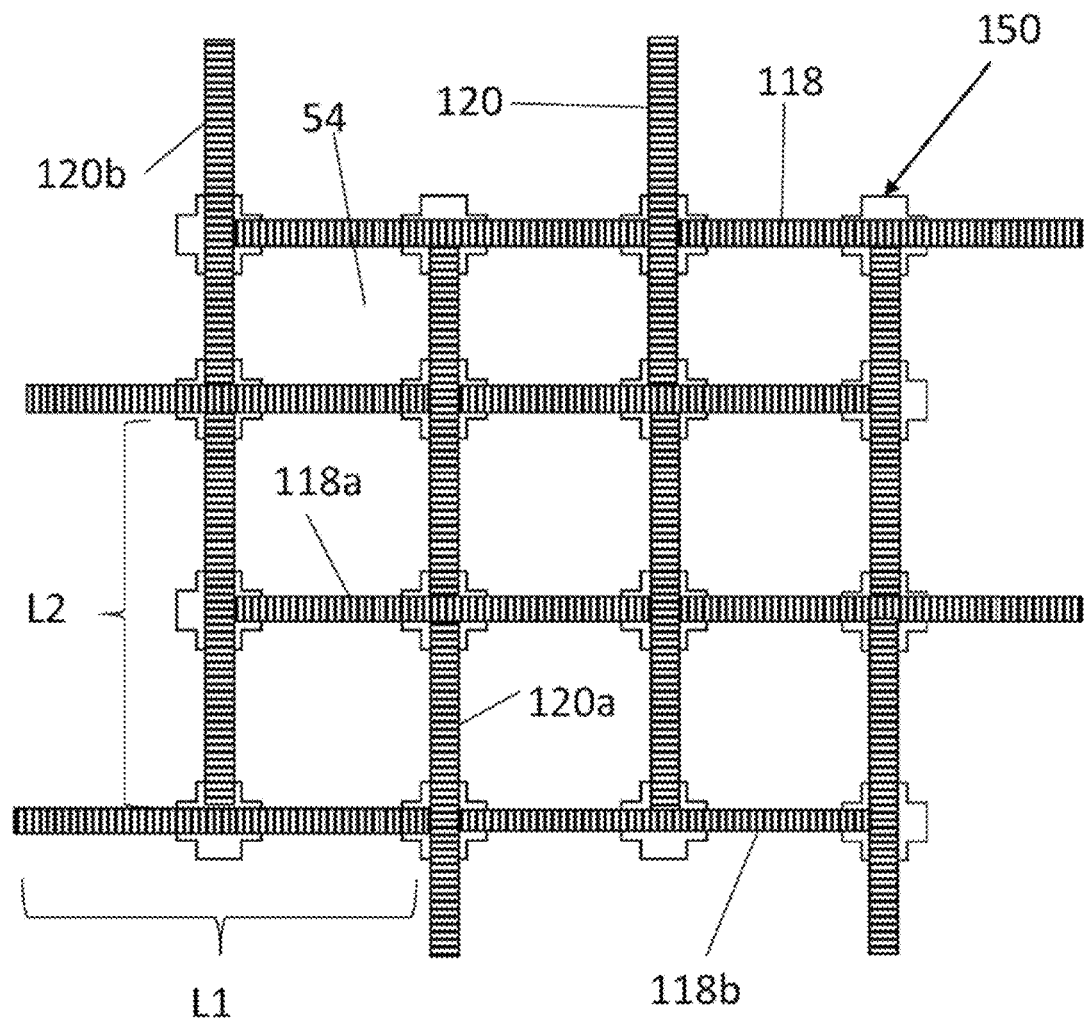
FIG. 13 is a perspective view showing the pattern of the grid elements at the intersections according to an embodiment of the present invention.
Figure 13:
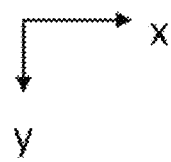

FIG. 8 shows a perspective view of the grid framework structure 114 according to an embodiment of the present invention. The basic components of the grid framework structure 114 according to the present invention comprises a grid 50 lying in a horizontal plane mounted to a plurality of upright columns or upright members 116. The term "upright member(s)" and "upright column(s)" are used interchangeably in the description to mean the same thing. As shown in FIG. 8, the grid 50 comprises a series of horizontal intersecting beams or grid members 118, 120 arranged to form a plurality of rectangular frames 54, more specifically a first a set of grid members 118 extend in a first direction x and a second set of grid members 120 extend in a second direction y, the second set of grid members 120 running transversely to the first set of grid members 118 in a substantially horizontal plane. Each of the grid members extending in the first direction and/or second direction can be sub-divided or sectioned into discrete grid element that are joined or linked together. A connection plate or cap plate 150 as shown in FIG. 9 can be used to link or join the individual grid elements together in both the first direction and the second direction at the junction where the grid elements cross or intersect at each of the upright columns, i.e. the cap plate 150 is used to connect the grid elements together to the upright columns 116. As a result, the upright columns are interconnected at their upper ends at the junction where the multiple grid elements cross in the grid structure by the cap plate 150. As shown in FIG. 9, the cap plate 150 is cross shaped having four connecting portions 152 for connecting to the ends or anywhere along the length of the grid elements at their intersections (see FIGS. 10 and 11). The cap plate 150 comprises a spigot or protrusion 154 that is sized to sit in a hollow central section 70 of the upright column 116 (at the second end of the upright column) in a tight fit for interconnecting the plurality of upright columns to the grid members as shown in FIG. 12. FIG. 13 shows the joints at the intersections between adjacent grid elements at an upper end of the upright columns by the one or more cap plates. For the purpose of explanation, a lower end of the upright column mounted to the floor constitutes a first end of the upright column and the upper end of the upright column adjacent the grid 50 constitutes a second end of the upright column.

The first and the second set of grid members supports a first and a second set of tracks or rails 57a, 57b respectively for a load handling device to move one or more containers on the grid framework structure. For the purpose of explanation of the present invention, the intersections 56 constitute nodes of the grid structure. Each of the rectangular frames 54 constitute a grid cell and are sized for a remotely operated load handling device or bot travelling on the grid framework structure to retrieve and lower one or more containers stacked between the upright columns 116. The grid 50 is raised above ground level by being mounted to the plurality of upright columns 116 at the intersections or nodes 56 where the grid members 118, 120 cross so as to form a plurality of vertical storage locations 58 for containers to be stacked between the upright columns 116 and be guided by the upright columns 116 in a vertical direction through the plurality of substantially rectangular frames 54. For the purpose of the present invention, a stack of containers can encompass a plurality of containers or one or more containers.

Figures 14A, 14B:
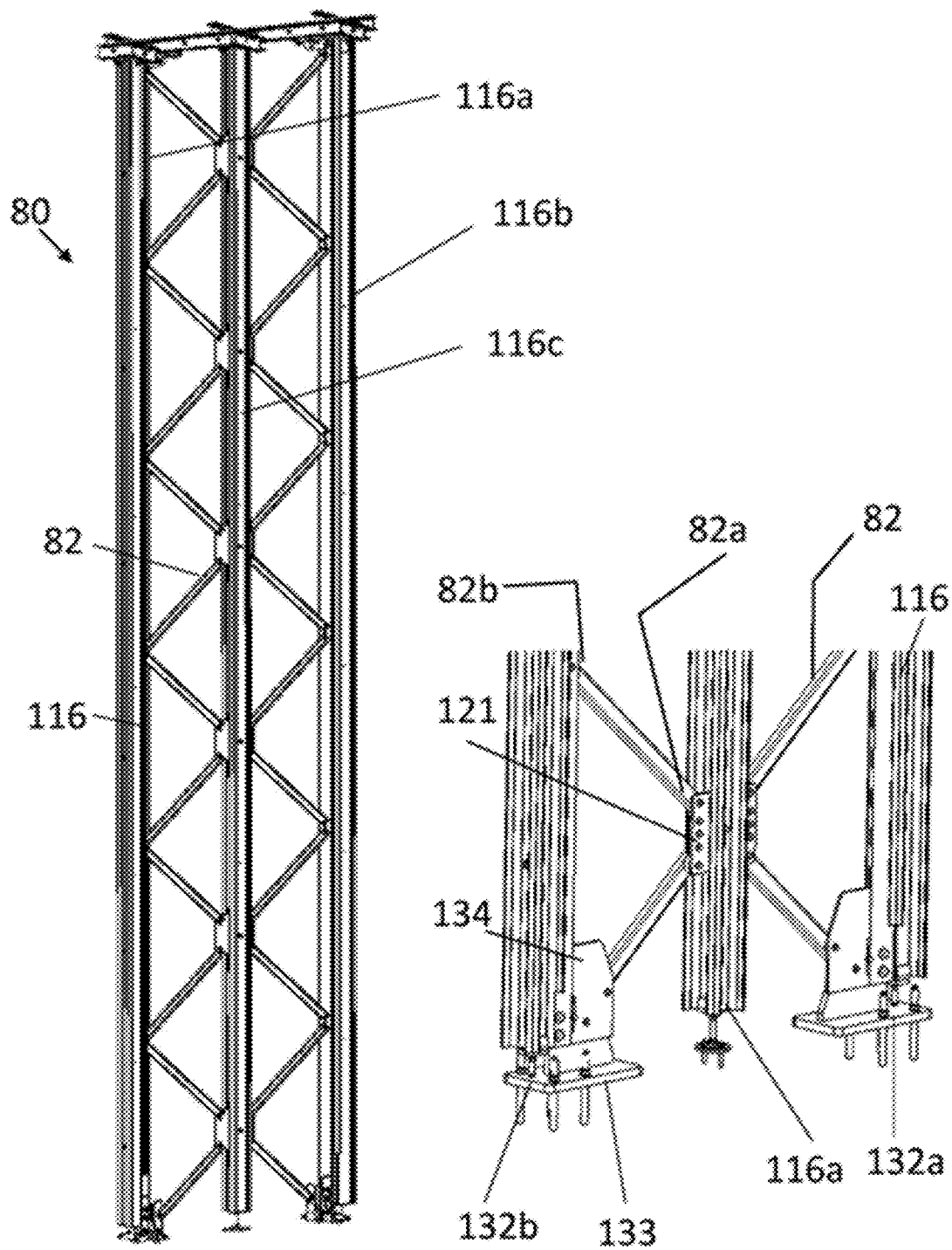
FIGS. 14a and 14b is a schematic views of a braced tower according to an embodiment of the present invention.

The grid framework structure 114 can be considered as a free standing (or self-supporting) rectilinear assemblage of upright columns 116 supporting the grid 50 formed from intersecting horizontal grid members 118, 120, i.e. a four wall shaped framework. Two or more of the upright columns are braced by at least one diagonal bracing member to provide one or more braced towers 80 within the grid framework structure 114. The structural rigidity and moment resistance of the grid framework structure is largely provided by incorporating one or more truss assemblies or braced towers 80 at least partially around the periphery and/or within the body of the grid framework structure (see FIG. 8). The truss assembly may have a triangular or other non-trapezoidal shape. For example, the truss assembly can be any type of truss that provides structural rigidity to the grid framework structure against lateral forces including but are not limited to Warren Truss or a K Truss or a Fink Truss or a Pratt Truss or a Gambrel Truss or a Howe Truss. Bolts or other suitable attachment means may be used to secure the diagonal braces to the upright columns. The braced tower 80 as shown in FIG. 14 according to an embodiment of the present invention can be formed by rigidly joining a sub-set or sub-group of the plurality of upright columns 116 by one or more angled or diagonal braces or diagonal bracing members 82. For the purpose of the present invention, the diagonal braces 82 cooperate with the upright columns 116 in a braced tower 80 to form one or more triangles. The sub-set of the plurality of upright columns that are braced together to form the braced tower 80 of the present invention can be two or more adjacent upright columns 116 lying in a same or in a single vertical plane and joined together by one or more diagonal braces 82. Putting it another way, two or more adjacent upright columns 116 connected by one or more diagonal braces 82 lie in the same or single vertical plane, i.e. they are co-planar. In the particular embodiment of the present invention shown in FIG. 14, each of the braced towers 80 comprise three upright columns in parallel relation and lie in a single vertical plane (co-planar) that are rigidly connected together by a plurality of diagonal braces 82. Two of the three upright columns 116*a*, 116*b* are laterally disposed either side of a middle upright column 116*c* and the two laterally disposed upright column 116*a*, 116*b* are rigidly connected to the middle upright column 116*c* by a plurality of diagonal braces 82. In the braced tower 80 of the present invention, one end of a diagonal bracing member 82 is connected to the middle upright column by a joining plate 121. The joining plate 121 is inserted into a slot through the hollow centre section of the middle upright column 116*c* in a direction perpendicular to the longitudinal direction of the upright column. By bracing one or more sub-groups of the upright columns 116 internally within the grid framework structure by one or more diagonal braces 82, the structural rigidity of the grid framework structure is improved. For the purpose of the present invention, the term "vertical upright column", "upright column" and "upright member" are used interchangeably through the description.

Figure 10:
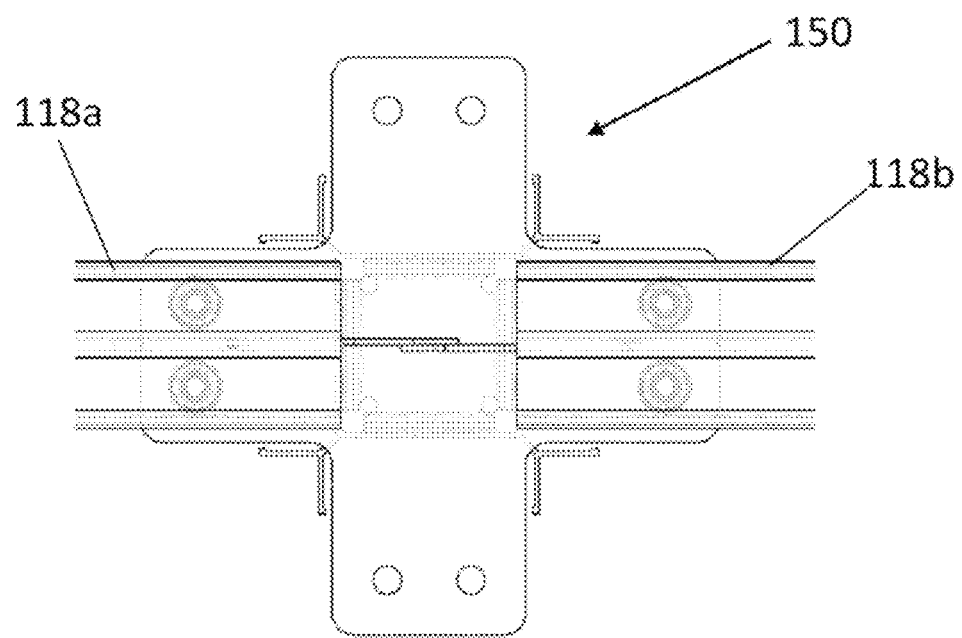
FIG. 10 is a perspective view of the cap plate linking adjacent grid elements by connecting the end of a grid element at the intersections according to an embodiment of the present invention.
Figure 15:
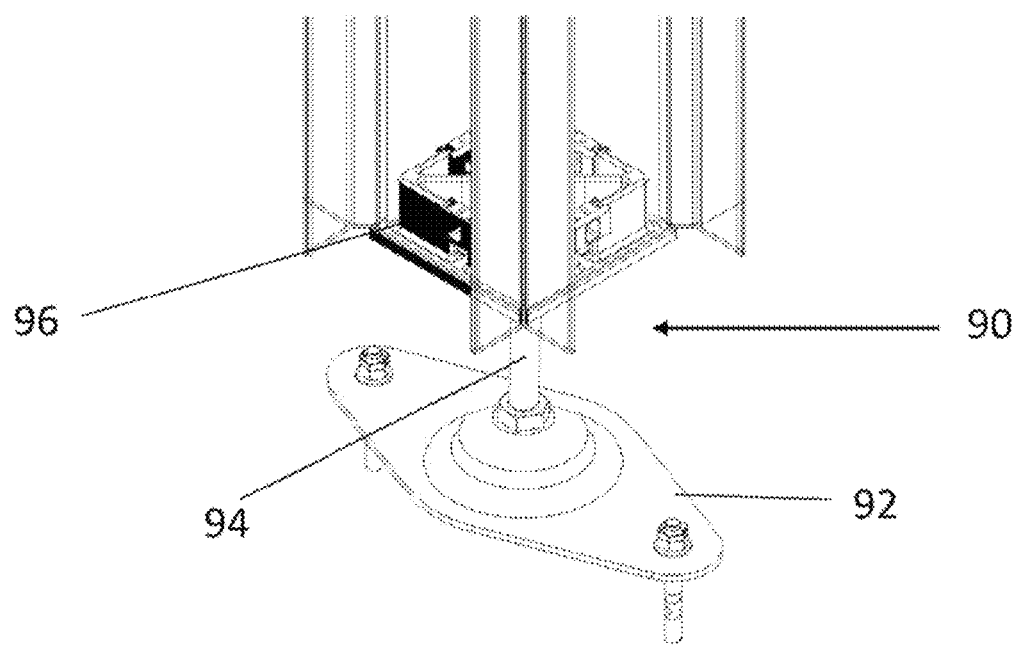
FIG. 15 is a perspective view of an adjustable foot according to an embodiment of the present invention.

The grid framework structure is anchored to the ground, in this case superstructure, by one or more anchor bolts. In an embodiment of the present invention, one or more of upright columns at their lower end are mounted to the superstructure by an adjustable foot (see FIG. 15). The adjustable foot allows the height of the one or more of upright columns and thus, the grid framework structure as a whole, to be adjusted. This allows the level of the grid in the horizontal plane to be substantially flat for the load handling devices, which are largely remotely operated, to travel on the grid structure and thereby, prevent any of the tracks or rails being put under strain due to a variation in the height of one or more of the upright members 116 in the grid framework structure. The adjustable foot 90 as shown in FIG. 15 comprises a base plate 92 and a threaded spindle or rod 94 that is threadingly engagable with a separate push fit cap or plug 96 that sits in the lower end of the upright column as shown in FIG. 10. As shown in FIG. 8, one or more of the upright columns 116 are mounted to the floor or superstructure by the base plate 92. The base plate 92 having one or more mounting holes for mounting the base plate 92 to the floor by one or more bolts.

In addition to mounting the upright columns making up the grid framework structure by the adjustable foot discussed above, one or more of the upright columns making up the braced towers 80 are anchored to the superstructure by one or more anchor feet 132*a*, 132*b* (see FIG. 14). In the particular embodiment shown in FIG. 14, the outer upright columns 116*a*, 116*b* or the laterally disposed upright columns 116*a*, 116*b* are anchored to the concrete foundation by one or more anchor feet 132 and the middle upright column 116*c* is supported on the adjustable foot 90 as discussed above. The lower end (first end) of the braced tower is anchored to the concrete foundation by one or more anchor bolts. Various types of anchor feet 132*a*. 132*b* to rigidly anchor the braced tower to the concrete foundation is applicable in the present invention. The anchor foot functions to bear the upright column load and the bracing load of the bracing assembly 82 of the braced tower 80.

Figure 16A:
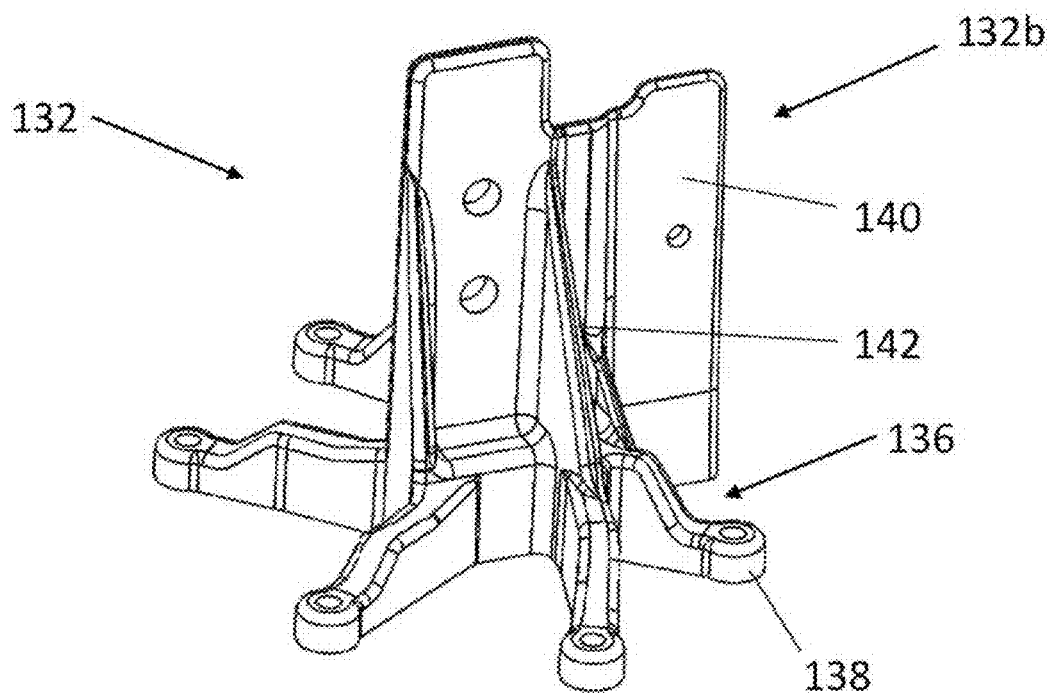
FIG. 16a is a side view of an anchor foot according to a second embodiment of the present invention.
Figure 16B:
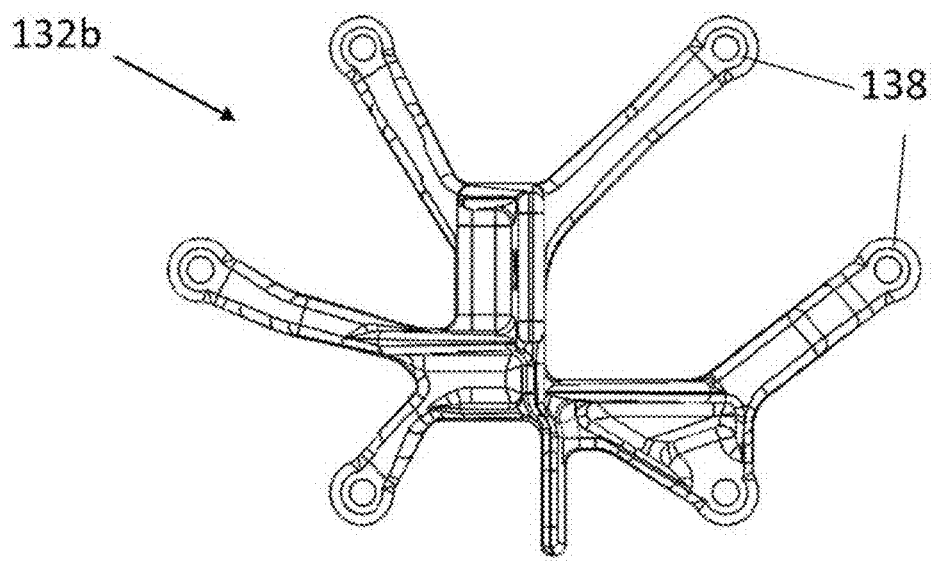
FIG. 16b is a top down view of the anchor foot according to the second embodiment of the present invention

FIGS. 14 and 16 show two examples of the anchor foot that is used to anchor the braced tower to the concrete foundation according to the present invention. In comparison to the anchor foot shown in FIG. 16, the anchor foot shown in FIG. 14 is more substantial in terms of size and weight in comparison to the anchor foot shown in FIG. 16. The anchor foot 132*a* shown in FIG. 14 is fabricated as a T-joint comprising a base plate 133 lying in a horizontal plane for anchoring to the floor by one or more anchor bolts and an anchor plate 134 perpendicular to the base plate 133 for attaching to the lower end of the upright column and the ends of the bracing member 82. The anchor plate 134 is orientated such that the surface of the anchor plate 134 with the greatest surface area lies in the same vertical plane as the three upright columns 116*a*, 116*b*, 116*c* of the braced tower 80, e.g. the surface of the anchor plate 134 with the greatest surface area and the upright members 116*a*, 116*b*, 116*c* of the braced tower 80 are co-planar. The problem with the anchor foot 132*a* shown in FIG. 14 is the substantial weight and thus, cost to fabricate the anchor foot.

FIG. 16 shows an alternative anchor foot 132*b* for anchoring the braced tower 80 to the concrete foundation according to second embodiment of the present invention. Instead of a solid rectangular base plate 133, the anchor foot is topology optimised that optimizes the materials layout within a given design space for a given set of loads. Two loads considered in the topology optimisation of the anchor foot are the loads from the upright columns 116*a*, 116*b*, 116*c* and the bracing members 82. Based on the constraints given by the applied loads, the anchor foot 132*b* of the present invention comprises a stabiliser 136 comprising a plurality of discrete fingers or digits 138 extending from an upright portion 140 such that loads are distributed amongst the plurality of fingers 138, e.g. separate fingers. In the particular embodiment of the present invention shown in FIG. 16, the upright portion 140 comprises an anchor plate arranged to rigidly connect to the upright column 116*a*, 116*b* and the diagonal brace 82 by one or more bolts so as to bear the load of the upright column 116*a*, 116*b* and the applied load of the diagonal brace 82. Like the anchor plate 134 of the first embodiment of the present invention shown in FIG. 14, the anchor plate 140 is oriented such that the surface of the anchor plate 140 with the greatest surface area lies in the same vertical plate as the three upright columns 116*a*, 116*b*, 116*c* making up the braced tower 80 of the present invention (see FIG. 11). Using the terminology of the present invention, the upright columns 116*a*, 116*b*, 116*c*, the diagonal braces 82 and the surface of the anchor plate 134, 140 all lie in the same plane, i.e. they are co-planar.

One or more of the discrete fingers 138 of the anchor foot 132*b* extend or span out in two or more different directions from the upright portion 140 so as to provide improved stability of the anchor foot 132*b*. One or more of the fingers 138 are of different lengths to aid with the stability of the anchor foot 132*b* of the present invention. The length of the fingers 138 can be different so provide different levels of stability of the braced tower 80. One or more connecting webs 142 are used to support the one or more of the fingers 138 from axial movement. The anchor foot 132*b* is anchored to the concrete foundation by one or more bolts through holes in the fingers 138 of the anchor foot 132*b*.

In the particular embodiment of the present invention, five fingers 138 of varying length are shown (see FIG. 16*b*) that extend from the upright portion 140 with holes at the distal ends of the fingers 138 for anchoring the anchor foot to the ground via an anchor bolt. The anchor foot 132*b* according to the second embodiment of the present invention can be formed as a single body, e.g. casting, or separate parts joined together, e.g. welding.

Anti-Seismic Grid Framework System

While the current grid framework structure 114 is adequate where the ground is relatively stable, i.e. having a spectral acceleration less than 0.33 g categorised as Type A and Type B events, this cannot be said where the grid framework structure is subjected to powerful seismic events generating strong lateral forces in excess of 0.55 g spectral acceleration categorised as a Type C or D seismic event. Such powerful seismic events compromise the structural fasteners joining the grid elements (e.g. track support elements) at the intersections, causing them to work their way loose or out of the cap plates to which they are bolted to. The result is the weakening or complete loss of structural integrity of the grid framework as the lateral forces no longer are able to be transferred safely down to the structural foundations. Failure may occur at the intersections of the grid members or track support elements making up the grid. The bracing towers 80 described above used to maintain the structural integrity of the grid framework structure may not able to withstand the lateral forces as a result of powerful Type D seismic events well in excess of 0.55 g.

Figure 17:
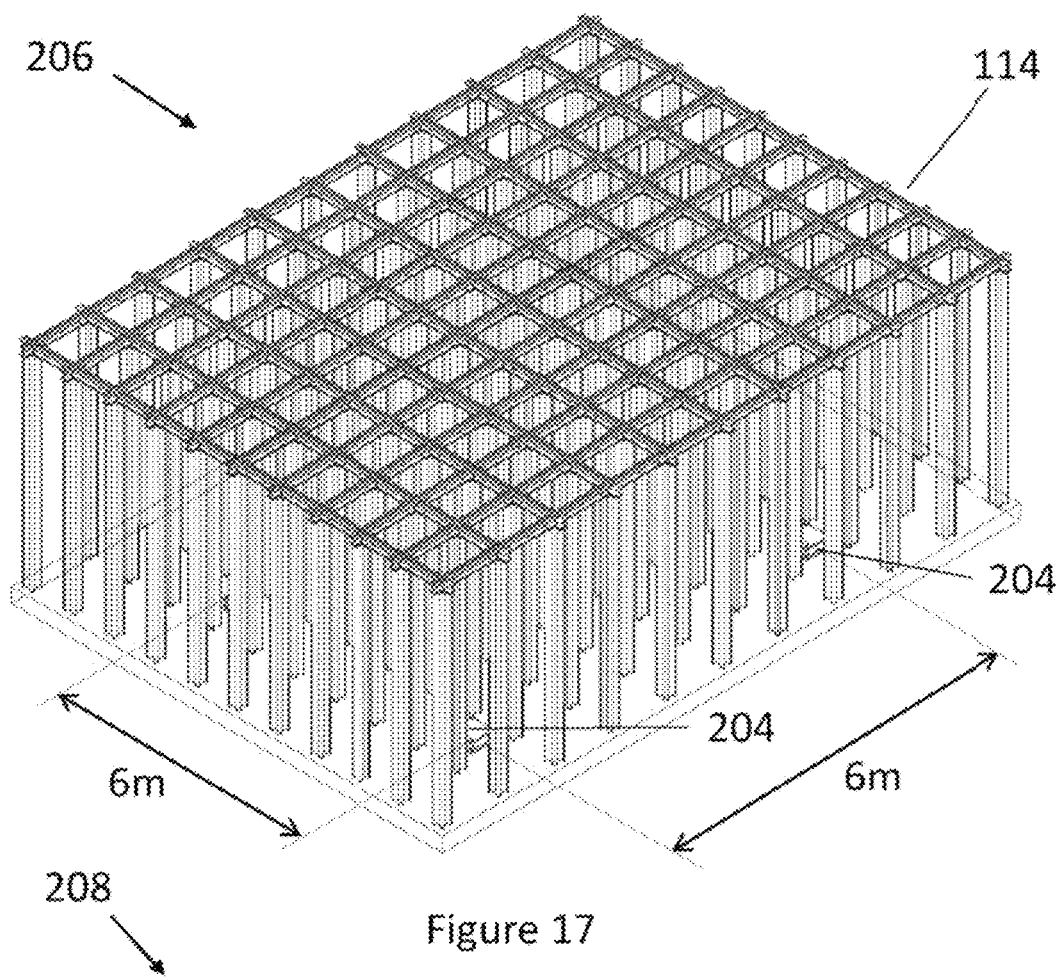
FIG. 17 is an isometric view of a section of the anti-seismic grid framework system showing the distribution of the base isolation devices at the base of the grid framework structure according to an embodiment of the present invention.

In a particular embodiment of the present invention, an anti-seismic grid framework system 206 is provided whereby the base or footing of the grid framework structure 114 is adapted with a flexible structure so as to damp or suppress or attenuate excessive movement of the grid framework structure relative to the ground or ground motion as a result of seismic forces. In the particular embodiment of the present invention, the base or footing of the grid framework structure 114 is made flexible by the provision of a seismic isolation system 208 and comprises at least one base isolation device 204 that suppresses or attenuates seismic waves. FIG. 17 is an example of an anti-seismic grid framework system 206 whereby the grid framework structure 114 is uncoupled from its foundation by the at least one base isolation device 204 to protect the grid framework structure 114 from lateral forces as a result of ground motion. The base isolation device 204 effectively dampens ground motion during strong seismic events and thereby, suppresses movement of the grid framework structure which effectively increases the period of vibration of the grid framework structure.

Figure 18:
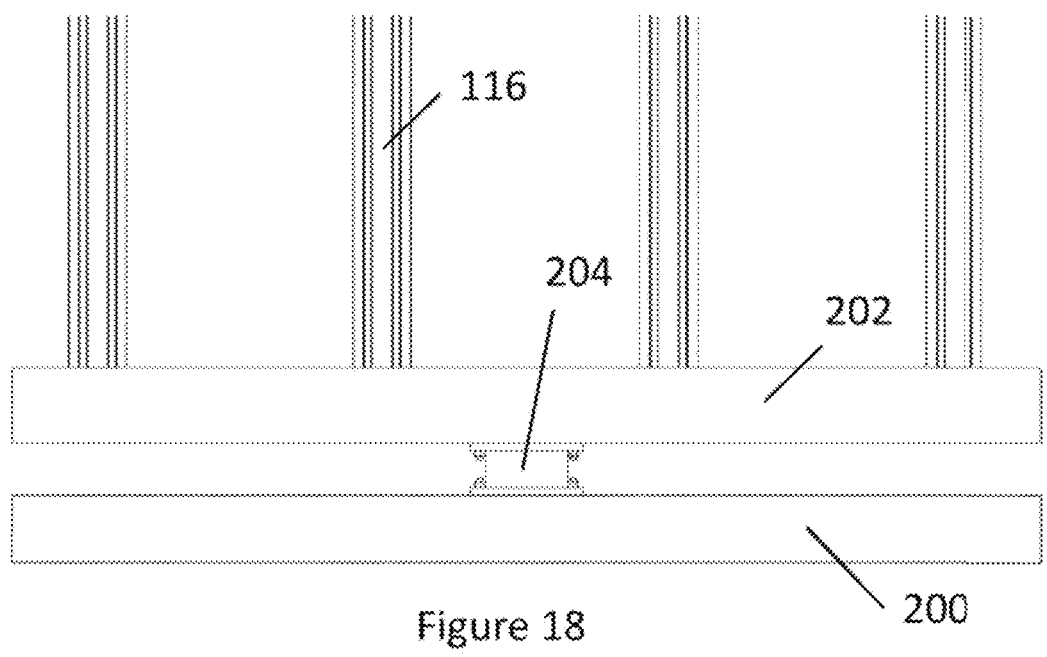
FIG. 18 is a cross sectional view of a portion of the seismic isolation system showing a base isolation device according to an embodiment of the present invention.

A cross sectional view of the seismic isolation system 208 according to the embodiment of the present invention is shown in FIG. 18. The seismic isolation system 208 comprises a superstructure or diaphragm 202 and a substructure or foundation 200. The superstructure 202 comprises at least part of and, in some cases, all of the load bearing structure of the grid framework structure 114. The superstructure 202 can be a concrete load bearing structure. The grid framework structure 114, more specifically, the footing of the upright columns 116 are mounted to the superstructure 202 by one or more anchor bolts. The upright columns 116 and thus, the grid framework structure 114 is mounted to the superstructure 202 by one or more adjustable feet 90 and/or anchor feet 132. Further detail of the adjustable foot and the anchor foot is discussed above. The requirement of the superstructure 202 at the base of the grid framework structure has the benefit of redistributing forces concentrated from one or more discrete braced frame locations to a relatively larger number of support points. The substructure 200 comprises at least the grid framework structure's foundation. This could be the ground or a concrete foundation.

Inter disposed between the superstructure 202 and the substructure 200 are one or more base isolation devices 204. The distribution of the base isolation devices 204 can be tuned to remove any irregularities or possible torsional issues in the superstructure 202. The one or more base isolation devices 204 decouples the superstructure 202 and thus, the grid framework structure 114 mounted thereon from the motion of the substructure or ground motion during earthquakes. In this way, large deflections and high accelerations are prevented being transmitted to the grid framework structure 114. The number and distribution of the one or more base isolation devices 202 is dependent on the weight of the grid framework structure, the height of the grid framework structure, i.e. container depth, Z and the composition of the ground. For example, while the energy of seismic waves with higher frequencies tends to be absorbed by solid rock soil, the seismic waves with lower frequency pass through the solid rock soil without being absorbed but are eventually amplified by soft sediments. As can be seen in FIG. 17, one or more base isolation devices are distributed in an array having a grid like pattern, each of the base isolation devices 204 being respectively mounted between the substructure 200 and the superstructure 202 by lower and upper mounting plates. The number and the pattern of one or more base isolation devices inter-disposed between the superstructure and the substructure is further discussed below. The base isolation devices provide the lateral flexibility of the seismic isolation system to attenuate ground movement being transmitted to the grid framework structure. Various known base isolation devices that attempt to get maximum energy dissipation by damping are permissible in the present invention. Options include elastomeric bearings, sliding bearings or a combination thereof.

In a first embodiment of the present invention, the at least one base isolation device comprises an elastomeric bearing 1204 which relies on the elastomeric properties of the bearing to attenuate lateral movement. The elastomeric bearing shown in FIG. 19 comprises a laminated assembly 1206 of alternating elastomeric layers 1207 and rigid layers 1208 vulcanized or glued together in a rubber body and inter disposed between upper and lower mounting plates 1210*a*. 1210*b* for fixing to the superstructure 202 and substructure 200 respectively. An example of an elastomeric bearing is described in U.S. Pat. No. 4,499,694 (Development Finance Corporation of New Zealand), U.S. Pat. No. 4,593,502 (Development Finance Corporation of New Zealand), EP3412929 (Olies Corporation) and/or EP2039958 (Olies Corporation); the details of which are incorporated herein by reference. The elastomeric bearing 1204 allows flexibility through its ability to move but return to its original position. For example, at the end of an earthquake, if the grid framework structure has not returned to its original position, the restoring force of the at least one elastomeric bearing will slowly bring the grid framework structure back to its original position.

The elastomeric layer 1207 is composed of an elastomeric material such as natural or synthetic rubber and the rigid layer is preferably fabricated from steel, aluminium, fiberglass, fabric or other suitable rigid material. The elastomeric layers 1207 provide lateral flexibility and the elastic restoring force to return the elastomeric bearing to its original position. The rigid layers 1208 reinforce the elastomeric bearing by providing vertical load capacity and preventing lateral bulge. The individual layers in the assembly are bonded to one another to form a unitary assembly or structure, e.g. by vulcanization.

Figure 19:
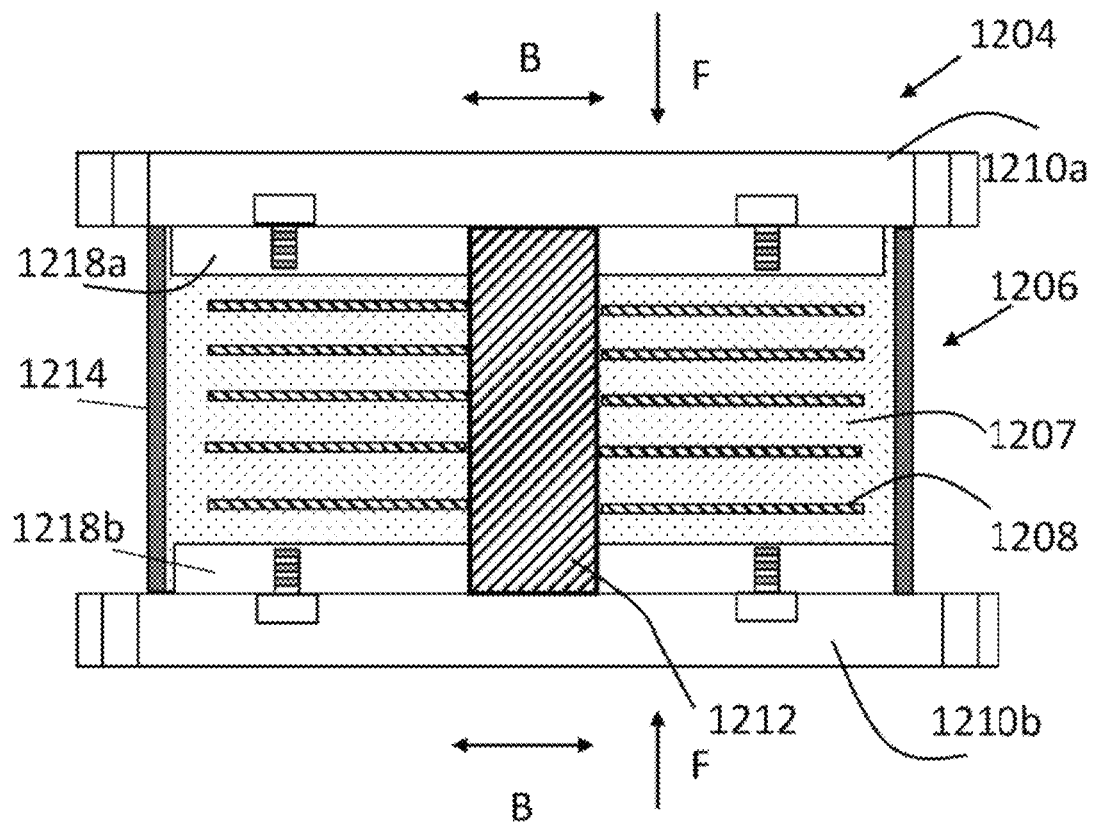
FIG. 19 is a cross-sectional view of an elastomeric bearing according to an embodiment of the present invention.

The grid framework structure together with one or more containers stacked in the vertical columns and the one or more load handling devices remotely operative to move the one or more containers stored in the grid framework structure make up a storage system of the present invention. The weight of one or more load handling devices operative on the grid and the additional weight of the containers not only increases the weight of the storage system but also increases the period of oscillation which reduces the spectral acceleration. As there is a lot of mass in the storage system, after a strong earthquake, the grid framework structure could continue to sway back and forth on one or more base isolator devices. Also shown in FIG. 19, is an optional energy dissipating core 1212 provided in a hollow portion in the interior of the laminated body 1206 and extending across the laminated body. For the purpose of the present invention, the term "laminated assembly" and "laminated body" are used interchangeably in the specification to mean the same feature. The energy dissipating core 1212 has a cylindrical shape and is adapted to damp the vibration in a shearing direction B of the laminated body by absorbing vibrational energy in the shearing direction B of the laminated assembly through deformation in the shearing direction B. The energy dissipating core 1212 is typically composed of lead, tin, zinc, aluminium, copper, nickel, or an alloy thereof and can be press fitted in place. Lead is preferably chosen because of its plastic properties. This is because lead is able to deform with the movement of the earthquake but will revert to its original shape, and is capable of deforming many times without losing its strength.

Figure 20:
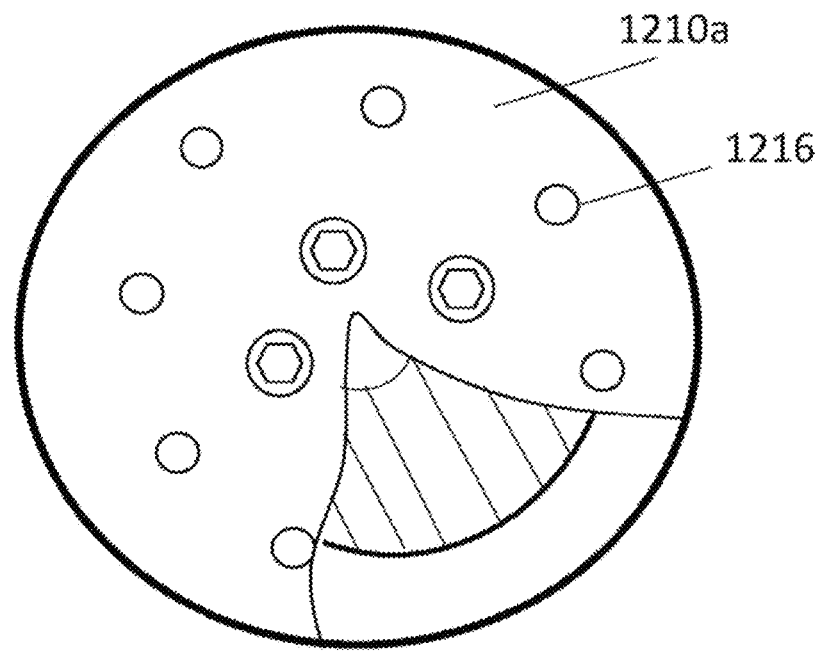
FIG. 20 is a top plan view of the elastomeric bearing shown in FIG. 19.

In a particular embodiment of the present invention shown in FIG. 19, the body of the laminated assembly 1206 has a circular cross-sectional shape such that the body of the laminated assembly 1206 has a cylindrical outer peripheral surface as shown in the top plan view of the elastomeric bearing in FIG. 20. Together with the hollow portion within the interior of the body of the laminated body, the laminated assembly constitutes an assembly of alternating annular elastomeric and rigid layers. The annular elastomeric and rigid layers are bonded together by vulcanization to form a cylindrical laminated body. The outer peripheral surface of the cylindrical laminated body is protected by an outer rubber covering 1214. The body of the laminated assembly 1206 is inter disposed between upper 1210*a* and lower mounting plates 1210*b*. The upper and lower mounting plates comprises one or more mount holes 1216 to mount the body of the laminated assembly to the superstructure and the substructure respectively. The one or more mounted holes are distributed around the circumferential edge or the peripheral edge of the upper and lower mounting plates.

Also shown in FIG. 19 is the upper and lower mounting plates 1210*a*, 1210*b* are respectively joined by one or more bolts to an upper connection steel plate 1218*a* and a lower connection steel plate 1218*b*. Optionally, the upper connection steel plate 1218*a* and/or the lower connection 1218*b* plate can comprise a relatively low friction material that enables the upper connection steel plate 1218*a* and/or the lower connection 1218*b* to slide against the respective upper mounting plate and/or the lower mounting plate.

Figure 21:
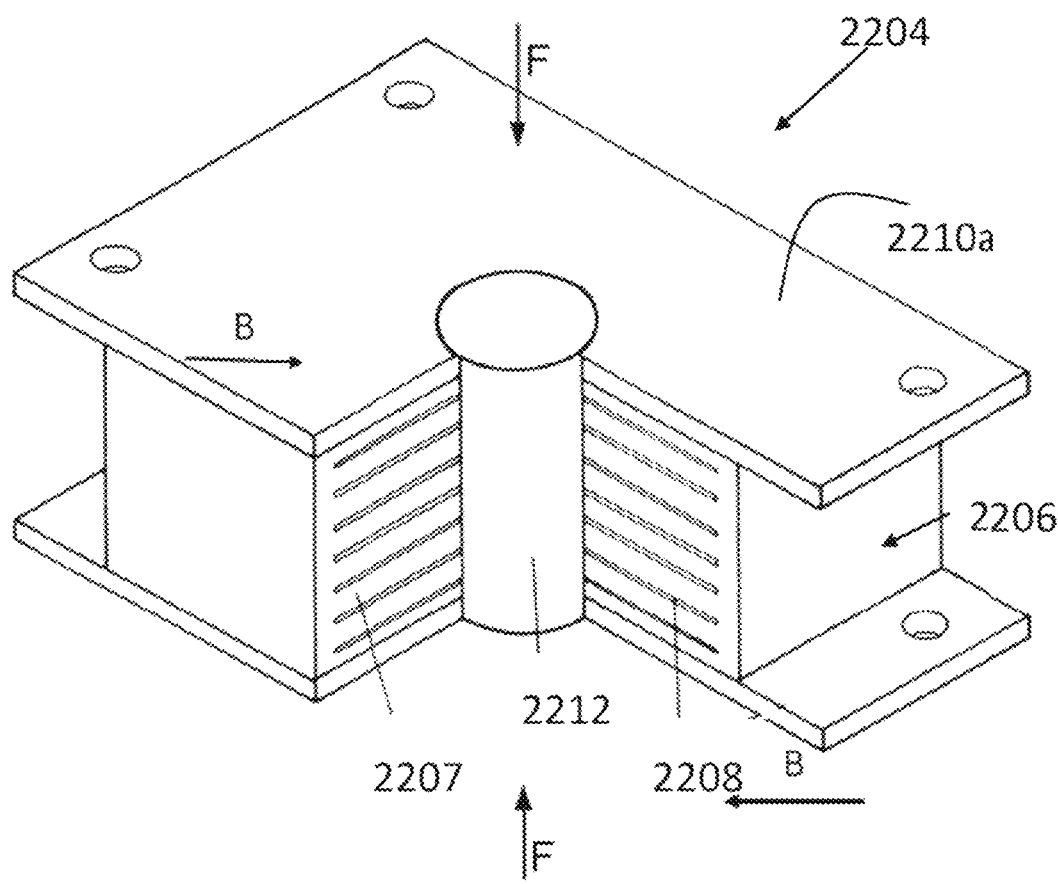
FIG. 21 is a cross-sectional view of an elastomeric bearing according to another embodiment of the present invention.

The provision of the upper connection steel plate 1218*a* and the lower connection steel plate 1218*b* are optional and the body of the laminated assembly can be inter disposed or sandwiched directly between the upper and lower mounting plates. The body of the laminated assembly is not just limited to having a cylindrical outer peripheral surface and other shapes, e.g. rectangular or square shape, are permissible in the present invention. For example, FIG. 21 shows an alternative configuration of the elastomeric bearing 2204 according to an embodiment of the present invention whereby the body of the laminated assembly has a square or rectangular cross-sectional shape. Also shown in FIG. 21, the body of the elastomeric bearing 2204 comprises alternating elastomeric layers 2207 and steel shims 2208 vulcanized or glued together, i.e. the steel shims are embedded within an elastomeric body 2206. An energy dissipating core 2212 is adapted to damp the vibration in a shearing direction B of the laminated body.

Figure 22:
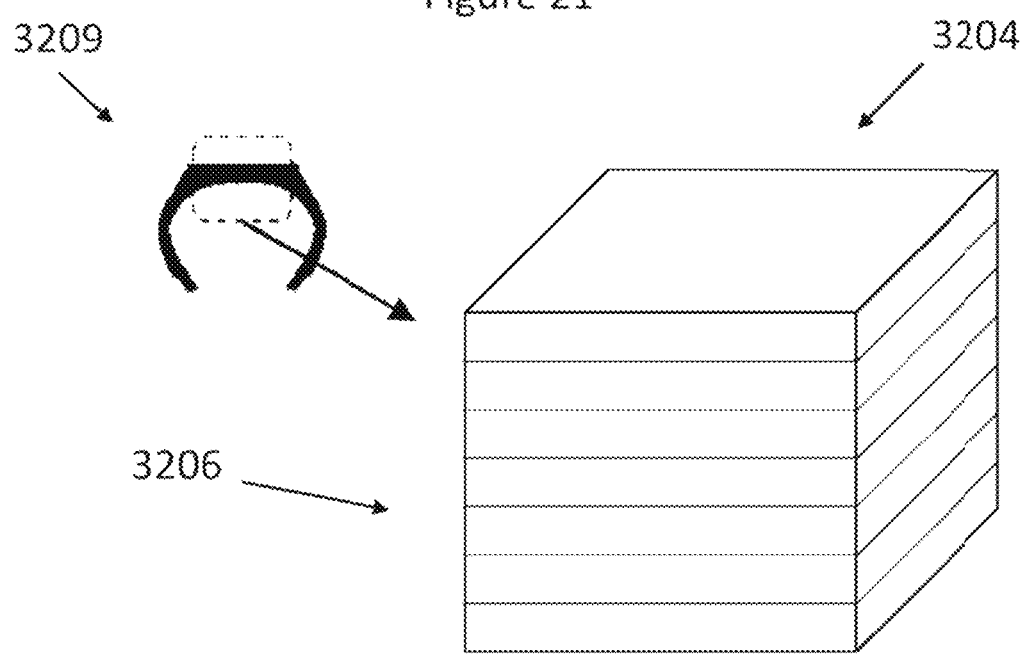
FIG. 22 is a cross-sectional view of an elastomeric bearing formed from a laminated assembly of recycled rubber tyres according to another embodiment of the present invention.

A more cost effective alternative to dissipate energy by elastic deformation permissible in the present invention, is the body of the laminated assembly can be replaced by a stack or laminated assembly of bonded recycled tyre rubber pads, each of the rubber pads contain interleaved steel reinforcing chords. The steel chords are considered to function similar to the rigid layers in that they reinforce the elastomeric bearing by providing vertical load capacity and preventing lateral bulge. FIG. 22 is a schematic layout of the laminated assembly 3206 of recycled rubber tyre layers or pads 3210. As can be seen to the left of FIG. 22, the tread part of the recycled tyres 3209 forms each of the rubber layers or pads of the elastomeric bearing assembly. The tyre pads 3210 are bonded together using a suitable adhesive. The use of recycled tyre rubber pads as a elastomeric bearing 3204 for attenuating seismic waves was extensively studied by Mishra et al (Mishra, H. K., Igarashi, A., Matsushima, H. and Furukawa, A (2012) "Experimental and analytical study of unbonded and bonded scrap tire rubber pad as base isolation device" 15th WCEE, Lisbon Portugal) and Munoz et al (Munoz, A. et al (2019) "Applicability Study of low-cost seismic isolator prototype using recycle rubber, Journal TECNIA Vol. 29, No. 2). As with the elastomeric bearing shown in FIGS. 19 and 21, the body of the laminated assembly 3206 of elastomeric layers are sandwiched between upper and lower mounting plates (not shown) for respectively mounting to the superstructure and substructure. Whilst not as effective in attenuating seismic waves as the elastomeric bearing 1204, 204 comprising a laminate assembly of elastomeric and rigid layers described above, the assembly 3206 of recycled tyre pads provides a low cost alternative that can be tailored to meet local building regulations. For example, the number and distribution of the base isolation devices inter disposed between the superstructure and the substructure can be tailored to provide different attenuation properties depending on the either the vulnerability of the grid framework structure to seismic effects in particular areas and/or the local building regulations. Further details of the different design alternatives of the base isolation devices are discussed below.

In all of the embodiments of the elastomeric bearing shown in FIGS. 19, 20, 21, and 22, the body of the laminated assembly is sandwiched between the upper and lower mounting plates. One or more of the elastomeric bearings can optionally comprise a slider disc (not shown) disposed between the laminated assembly and either the upper mounting plate 1210*a* or the lower mounting plate 1210*b* or both. The slider disc preferably comprises PTFE (Teflon) and allows the upper or the lower bearing plate to move relative to the body of the laminated assembly. The upper mounting plate and/or the lower mounting plate may comprise one or more stops that butt up against an upper end or lower end of the laminated assembly. The slider disc provides additional damping through the sliding friction of the contact surface between the slider disc and the upper mounting plate and/or the lower mounting plate.

Figure 32:
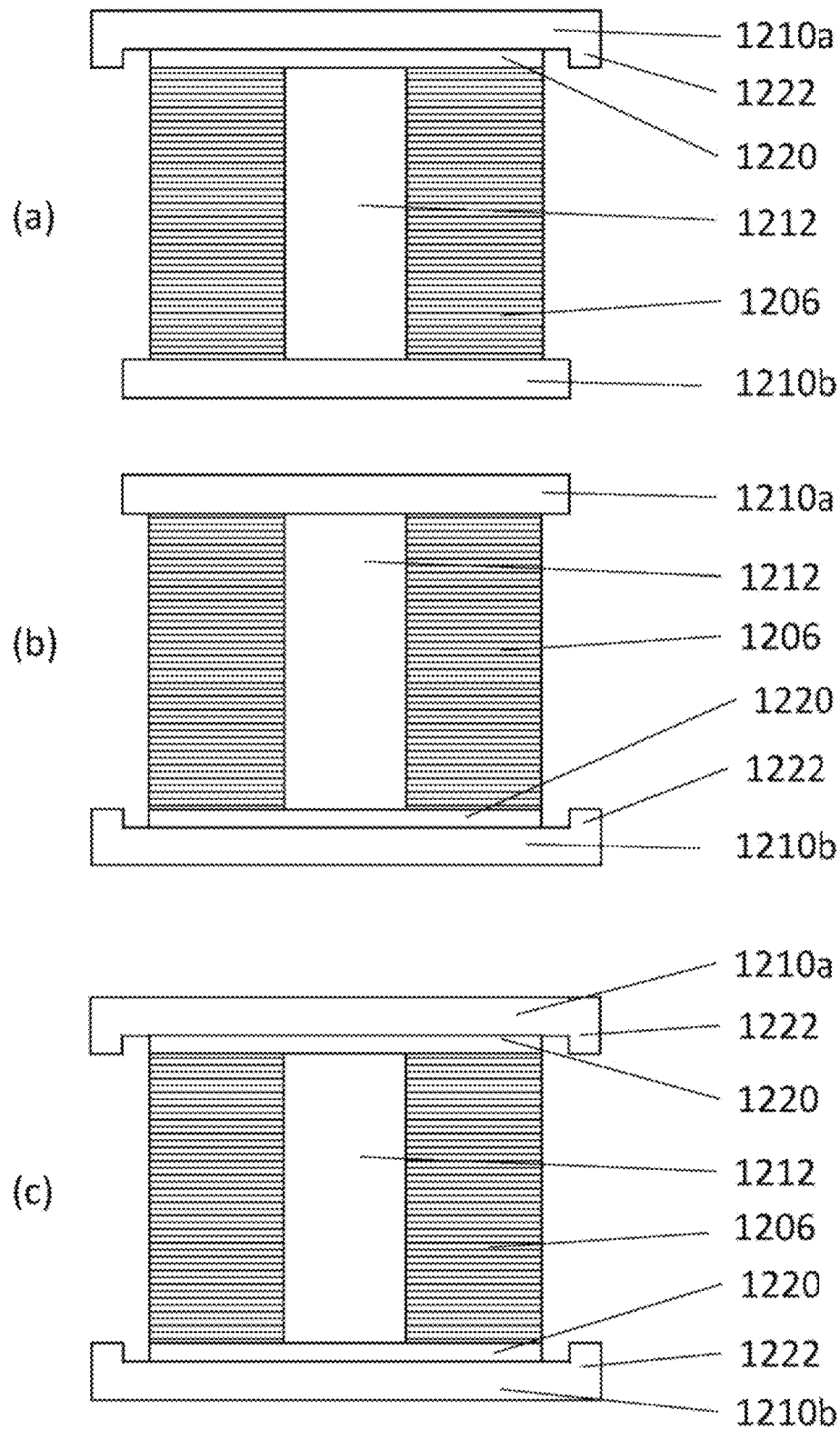
FIG. 32 is a schematic view of an elastomeric bearing with slider disc located (a) above the laminated assembly (b) below the laminated assembly (c) both above and below the laminated assembly.

FIG. 32 schematically illustrates an elastomeric bearing with slider disc. In FIG. 32 (*a*), the slider disc 1220 is disposed between the laminated assembly 1206 and the upper mounting plate 1210*a*. The upper mounting plate 1210*a* comprises stops 1222. In FIG. 32 (*b*), the slider disc 1220 is disposed between the laminated assembly 1206 and the lower mounting plate 1210*b*. The lower mounting plate 1210*b* comprises stops 1222. In FIG. 32 (*c*), there are two slider discs 1220, the first slider disc 1220 disposed between the laminated assembly 1206 and the upper mounting plate 1210*a*, and the second slider disc 1220 disposed between the laminated assembly 1206 and the lower mounting plate 1210*b*. Both the upper mounting plate 1210*a* and the lower mounting plate 1210*b* comprise stops 1222.

Embodiments of the elastomeric bearing including a slider disc provide the combined functions of isolation and allowing lateral sliding movement. This better distributes the load of the superstructure and grid between the base isolation devices, and accounts for uneven movement between the support points. This is particularly useful in smaller fulfilment centres, where the loads are smaller, and in some examples the better distribution of loads may mean that a lower quality concrete may be used for the superstructure, thus saving on manufacturing and installation costs.

In a second embodiment of the present invention, the at least one base isolation device can be based on a sliding system. In a sliding system, energy is dissipated by one or more slide pendulum bearings or friction pendulum bearings where a slider is typically arranged to slide against a surface, e.g. by exploiting the reciprocal sliding arrangement between a convex and spherical concave surface. For the purpose of the present invention, the term "sliding pendulum bearing", "slide pendulum bearing", "slide bearing" and "friction pendulum bearing" are used interchangeably in the specification to mean the same feature. The reciprocal sliding arrangement between a convex and spherical concave surface allows the sliding bearing to naturally return to its original position without relying on the elastomeric properties of the body of the bearing, i.e. the concave sliding surface allows a restoring force to ensure self-centring capability. The simplest sliding system comprises a single friction pendulum bearing which consists of a spherical concave surface supporting a frictional slider. The geometry and/or the friction between the slider and the spherical concave surface serves an important function of dissipating the energy associated with seismic movements. The geometry of the contact surface between the slider and the spherical concave surface relates to the radius of curvature of the spherical concave surface. The radius of curvature of the spherical concave surface influences the period of oscillation of the slider and thus the restoring force. The greater the radius of curvature of the spherical concave surface, the greater the period of oscillation. The lateral travel of the slider is accompanied with a vertical movement of the superstructure, and thus, the mass of the storage system provides a restoring force. The lifting of the superstructure during seismic ground motions results in an equivalent pendulum motion having one dynamic natural period of vibration based on a pendulum motion. The natural period of vibration of the sliding system (T) is equivalent to:

$$T = 2\pi (L/g)^{1/2} \qquad (1)$$

where L is the effective pendulum length and g is the acceleration due to gravity. The effective pendulum length L is proportional to the radius of curvature of the spherical concave surface given by the equation:

$$L = R \cos \theta \qquad (2)$$

where θ is the angle the pendulum makes with the vertical and R is the radius of curvature of the spherical concave surface.

In addition to controlling the geometry of the spherical concave surface, the coefficient of friction between the slider and the spherical concave surface is controlled or predetermined so as to provide resistance to loads or forces from the normal operation of the grid framework structure but low enough to be overcome in a seismic event. This prevents the one or more slide bearings being activated, i.e. the frictional slider slipping, during normal operation or use of the storage system. The forces exerted through normal operation of the storage system include but are not limited to the forces generated by one or more load handling devices operational on the grid which include the load handling devices travelling on the rail/tracks as well as the operation of the grabber device to pick and lower a container within the vertical storage columns. The friction coefficient is overcome in a seismic event allowing the slider to move on its respective spherical concave surface. The coefficient of friction between the slider and the spherical concave surface can be tailored by coating or treating the contact surface between spherical concave surface and the slider with a special material. For example, the spherical concave surface is coated with the special material to provide a tailored coefficient of friction between the slider and the spherical concave surface. Equally or in addition, the coefficient of friction between the slider and the spherical concave surface can be controlled by coating just the slider with a bearing liner material. In the case of the elastomeric bearing discussed above, the restoring force can be controlled by controlling the elastic properties of the elastomeric material, e.g. controlling the number of elastomeric and rigid layers and the composition of the energy dissipating core such that the elastomeric bearing is not activated during normal operation of the storage system. This allows the storage system to function normally during operation without the base isolation device being activated.

To cater for different intensities of earthquake ground motion, preferably, the slide bearing comprises multiple slide bearings connected in series to support the grid framework structure each of the multiple slide bearings providing distinct sliding pendulums. When connected in series, a lateral displacement of the substructure will be distributed amongst one or more of the multiple slide bearings. The sum of the displacements occurring in the multiple pendulum mechanisms is equal to the total structure displacement at a support point. In this way, different pendulum mechanism become active at different strengths of seismic motions. This is to mitigate the effects of a sliding bearing selected to minimize the impact of lower strength service level earthquakes that are expected to occur more than once during the life of the grid framework structure but being less effective to minimize the impact of more stronger earthquakes that a have probability of occurring during the life of the grid framework structure.

The different pendulum mechanisms become active at different strengths of seismic motions by using different coefficient of friction for the different pendulum mechanisms, i.e. they exhibit different hysteretic properties at different displacements. In this manner, as each pendulum mechanism is activated both the effective length pendulum length and the effective friction increase as each pendulum mechanism is sequentially activated. In a preferred embodiment of the present invention, the sliding pendulum bearing provides three distinct pendulum mechanism or so called Triple Pendulum™ bearing supplied by Earthquake Protection Systems (EPS), Inc. having a place of business in Vallejo, Canada, that progressively exhibits different hysteretic properties at different stages of displacement. Detail of the Triple Pendulum™ bearing is further discussed in US2006/0174555 (Victor, Zayas and Stanley Low), the details of which are incorporated herein by reference.

Figure 23:
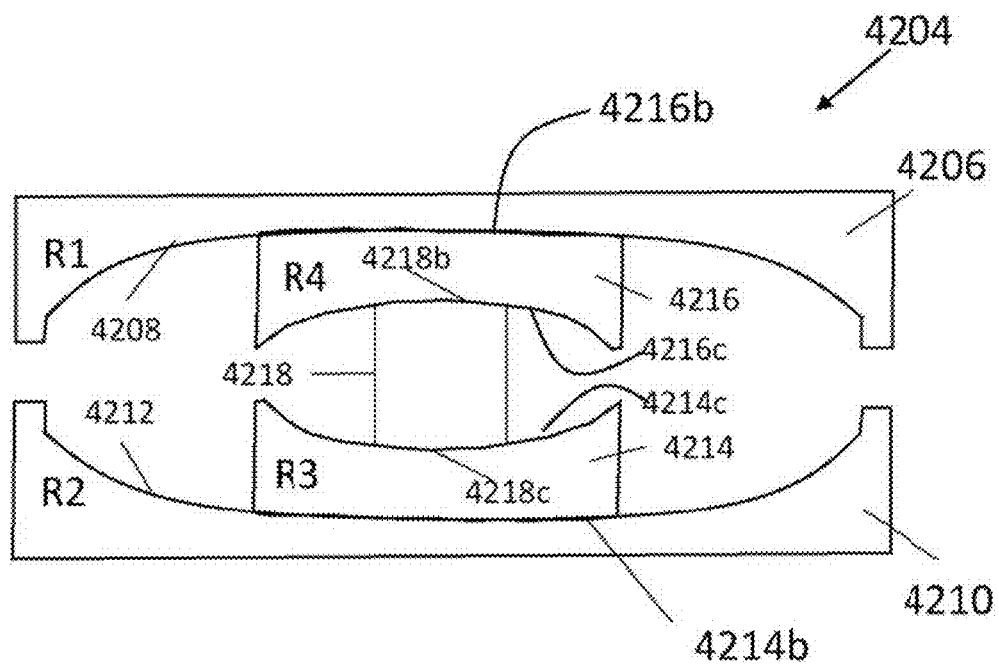
FIG. 23 is a cross-sectional view of a Triple Pendulum Bearing™ by Earthquake Protection Systems.

FIG. 23 shows a cross-sectional view of Triple Pendulum™ bearing 4204 forming the at least one base isolation device of the seismic isolation system of the present invention. As discussed in US2006/0174555 (Victor, Zayas and Stanley Low), the Triple Pendulum™ bearing comprises four concave surfaces to provide three independent pendulum mechanisms. The Triple Pendulum™ bearing comprises an upper bearing element or plate 4206 having a downward facing concave spherical surface 4208 with a specified radius of curvature, $R_1$ and a lower bearing element 4210 having an upward facing concave spherical surface 4212 with a specified radius of curvature, $R_2$. The upper bearing element 4206 and the lower bearing element 4210 can be in the form of an upper bearing plate and a lower bearing plate and each can be fabricated from a single material such as stainless steel or iron. A coating is deposited on the concave spherical surface 4208, 4212 of the upper bearing element 4206 and the lower bearing element 4210 to facilitate sliding. Bolt holes (not shown) are formed around the perimeters of the upper bearing element 4206 and the lower bearing element 4210 for connecting the sliding pendulum bearing to the superstructure and the substructure respectively. Inter disposed and in sliding arrangement between the upper bearing element 4206 and the lower bearing element 4210 are a plurality of sliders comprising outer sliders 4214, 4216 and an inner slider 4218.

For a Triple Pendulum™ bearing, the outer sliders comprises a first slider 4214 and a second slider 4216. Inter disposed and in sliding arrangement between the outer sliders is the inner slider or a third slider 4218. The contact surface of each of the first 4214, second 4216 and third sliders 4218 are adapted so that each of the first, second and the third sliders progressively slide along their respective concave spherical surfaces to provide pendulum mechanisms that become active at different strengths of seismic motion. The first slider 4214 has a convex surface 4214b that slides along the upward facing concave spherical surface 4212 of the lower bearing element 4210 and has a spherical concave surface 4214c having a radius of curvature $R_3$ which is smaller than the radius of curvature of the lower bearing element $R_2$. The contact surface between the first slider 4214 and the lower bearing element 4210 is adapted to provide a first coefficient of friction for a design level of earthquake. This could be achieved by either lining the upward facing concave spherical surface 4212 of the lower bearing element 4210 and/or lining the convex surface 4214b of the first slider 4214 with a bearing lining material.

The second slider 4216 has a convex surface 4216b which is adapted to slide along the downward facing spherical concave surface 4208 of the upper bearing element 4206 and also has a concave spherical surface 4216c having a radius of curvature $R_4$ equal to the radius of curvature of the concave spherical surface Ra of the first slider 4214. Like the first slider 4214, the radius of curvature $R_4$ of the concave spherical surface 4216c of the second slider 4216 is smaller than the radius of curvature $R_1$ of the upper bearing element 4206. The contact surface between the second slider 4216 and the upper bearing element 4206 is adapted to provide a second coefficient of friction but this time suitable for a maximum credible earthquake, typically two to three times or more the friction coefficient of the first slider 4214. In this way, the first slider 4214 is adapted to slide along the upward facing concave spherical surface 4212 of the lower bearing element 4210 before the second slider 4216 is made to slide along the downward facing concave spherical surface 4208 of the upper bearing element 4206.

The third slider 4218 forms an inner slider and is disposed between the first slider 4214 and the second slider 4216. The third slider 4218 has convex spherical surfaces at the bottom and top 4218b, 4218c of the slider that is arranged to respectively slide along the concave spherical surfaces of the first slider 4214 and the second slider 4216. The convex surfaces 4218b, 4218c of the third slider 4218 is surfaced with a bearing liner material such that the sliding surface between the third slider 4218 and the first slider 4214 has a third coefficient of friction and the sliding surface between the third slider 4218 and the second slider 4216 has a fourth coefficient of friction. The coefficient of friction between the sliding surfaces of the third slider 4218 and both the concave spherical surfaces of the first slider 4214 and the second slider 4216 are equal, i.e. the third coefficient of friction is substantially equal to the fourth coefficient of friction. However, the third and/or the fourth coefficient of friction is typically ½ to ⅓ of the coefficient of friction of the first slider against upward facing concave spherical surface of the lower bearing element, i.e. the first coefficient of friction. The low coefficient of friction between the contact surface of the third slider 4218 and the concave spherical surfaces of the first slider 4214 and the second slider 4216 (i.e. the inner pendulum mechanism) minimizes high frequency vibrations of the ground motion being transmitted to the grid framework structure via the superstructure. Reducing such high frequency vibrations mitigates damage to the one or more load handling devices operative on the grid and/or the containers stored within the vertical storage columns, particularly spillage of the contents of the containers. High frequency vibrations have a tendency to derail the one or more load handling devices from the tracks and in a worst case scenario cause the one or more load handling devices to topple over on the grid. Moreover, owing to the low coefficient of friction the third slider is able to accurately return to its equilibrium or original position once displaced.

To protect the interior surfaces, in particular the contact surfaces of the sliders from contamination and to maintain the assembly of the sliders together, the upper bearing element and the lower bearing element can be joined together with an elastic seal (not shown) around the periphery of the upper and lower bearing element. The elastic seal is configured to accommodate large deformations required during earthquake motions. Equally, to protect the interior surfaces of the sliders from contamination and to maintain the components of the first slider 4214 and the second slider 4216 together, the first slider and the second slider would typically be joined together with an elastic seal (not shown) around the perimeter of the first and second slider.

Figure 24A:
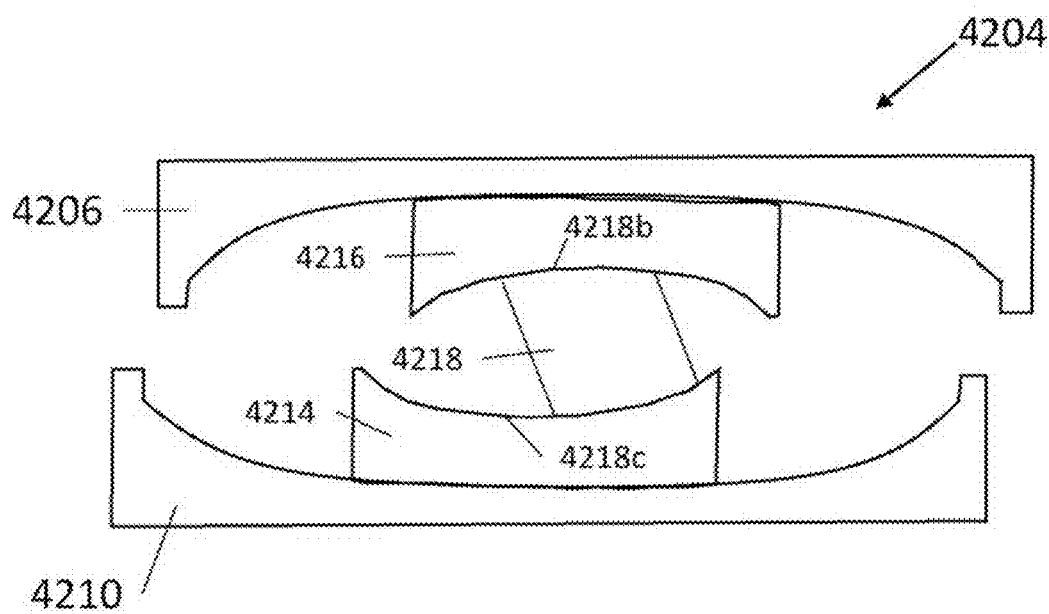
FIG. 24a-c is a perspective view showing the three different displacement positions of the Triple Pendulum Bearing™.

FIG. 24 (a to c) shows the translation of the sliders during earthquake motions to provide the three different pendulum mechanisms of the Triple Pendulum™ bearing. Further detail of the Triple Pendulum™ bearing is discussed in US2006/0174555 (Victor, Zayas and Stanley Low), the details of which are incorporated herein by reference The stages of the lateral horizontal movement of the individual sliders during ground motion are dependent on the friction of the contact surfaces between the respective sliders and against the spherical concave surfaces of the upper and lower bearing elements. In a first instance of ground motion as shown in FIG. 24a, the coefficient of friction is such that the first slider 4214 translates horizontally relative to the second slider 4216, but due to the friction ($1^{st}$ coefficient of friction) between the first slider 4214 and the lower bearing element 4210 and the friction ($2^{nd}$ coefficient of friction) between the second slider 4216 and the upper bearing element 4206 both the first slider 4214 and the second slider 4216 do not move relative to the respective concave surfaces of the lower bearing element 4210 and the upper bearing element 4206. In other words, the friction between the first slider and the second slider against the respective concave spherical surface of the lower bearing element and the upper bearing element are too high during the initial displacement the slide bearing. A first pendulum motion is thus only provided by the third slider 4218 rotating and translating horizontally along the concave spherical surface of the first slider 4214 and the second slider 4216. The coefficients of friction between the bottom and top convex surface 4218b, 4218c of the third slider 4218 and the concave spherical surfaces of the first slider 4214 and the second slider 4216 are such that the third slider 4128 is able to slide easily so as to dampen the high frequency vibrations.

Figure 24B:
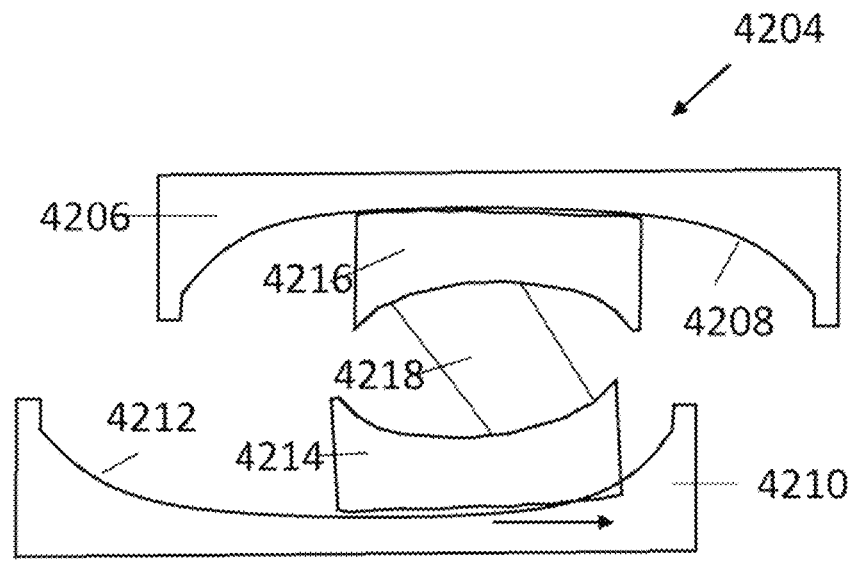
Figure 24C:
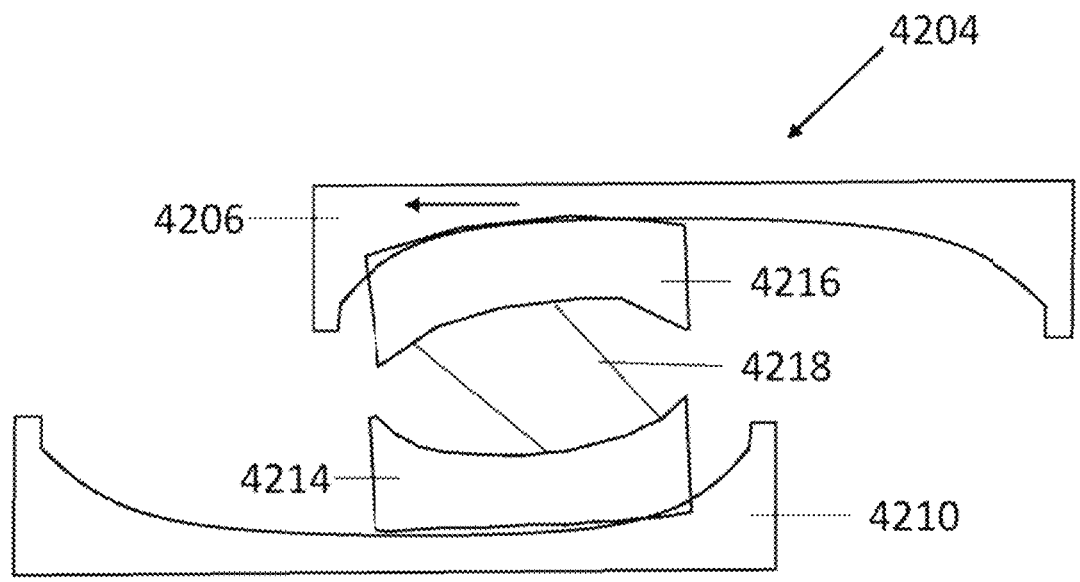

The first pendulum motion is demonstrated in FIG. 24a. As the ground motion progressively gets larger, the first coefficient of friction is overcome causing the first slider 4214 to slide along the concave spherical surface 4212 of the lower bearing element 4210, and therefore provide a second pendulum motion. The movement of the first slider relative to the lower bearing element is demonstrated by the arrow shown in FIG. 24b. Whilst FIG. 24b shows the first slider initially moving towards the right, the movement of the first slider is not limited to one direction and can initially move towards the left. In reality, the sliders move in both left and right directions as a result of vibrations of the ground motion. Finally, as the ground motion progressively gets larger, the second coefficient of friction is overcome causing the second slider 4216 to slide along the upper bearing plate 4206 to provide a third pendulum mechanism. This is demonstrated in FIG. 24c. The coefficients of friction of the sliders are tailored to provide different levels of damping at different strengths of seismic motions.

Multiple slide bearings disposed between the substructure and the superstructure are arranged to isolate the grid framework structure from ground motions at different strengths of seismic motion. For example, the separate pendulum mechanisms of the slide bearing can be tailored to dampen various areas or components of the storage system that are more susceptible to different frequencies of vibration. Whilst the braced towers provide some degree of structural integrity and support to the grid framework structure from ground motions resulting from weak seismic events, e.g. spectral acceleration less than 0.55 g, this may not be the case of the one or more load handling devices operative on the grid or tracks. A slide bearing can be tailored so that different pendulum mechanisms becomes active at different strength of seismic motion so as to provide damping for the different areas of the storage system. These include but are not limited to the one or more load handling devices operative on the grid and/or the one or more containers stacked within the vertical storage columns.

In addition to providing different levels of damping from multiple slide bearings, combination of different base isolation devices can also be used to provide the necessary base isolation properties at different strengths of seismic motions, i.e. load capacity, lateral flexibility, energy dissipation and self-centring capability. For example, slide bearings with low friction can be combined with elastomeric bearings discussed above. The slide bearings with low friction are able to dampen high frequency vibrations that are transmitted to the grid framework structure and the elastomeric bearings are able to dampen strong seismic forces.

Figure 25:
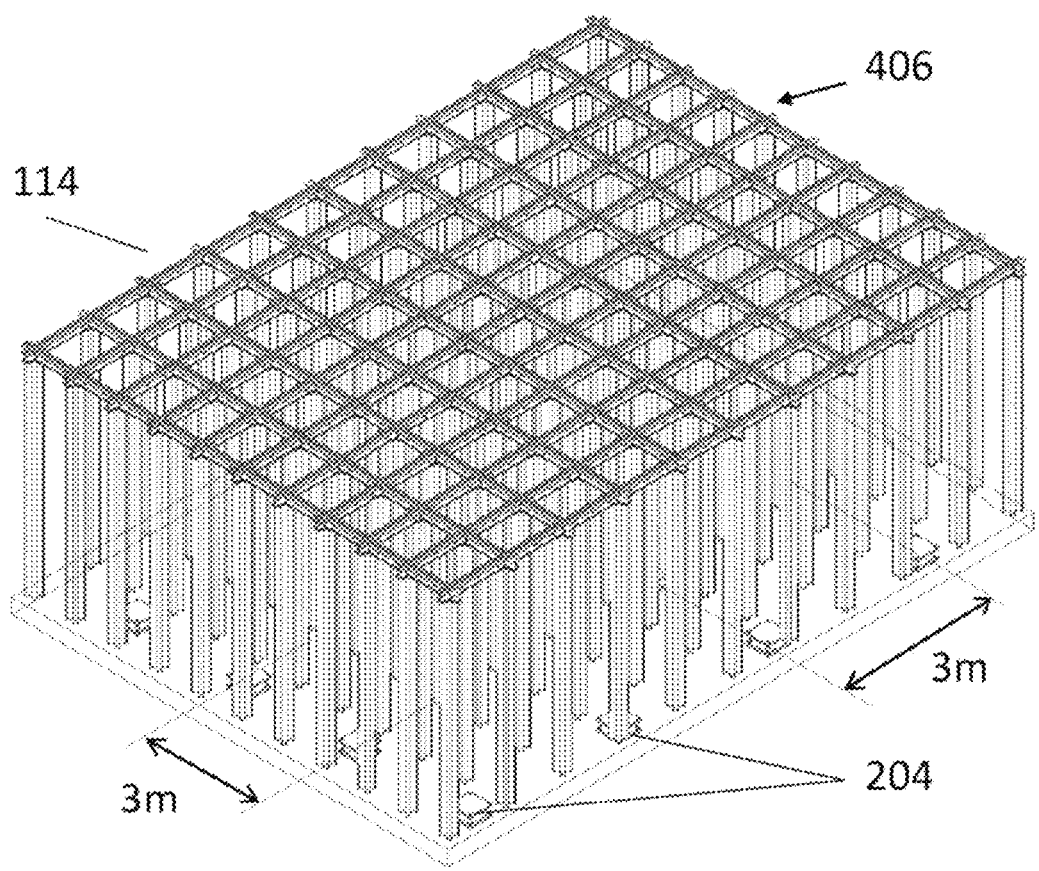
FIG. 25 is an isometric view of a section of the anti-seismic grid framework system showing the distribution of the base isolation devices at the base of the grid framework structure according to another embodiment of the present invention.
Figure 26:
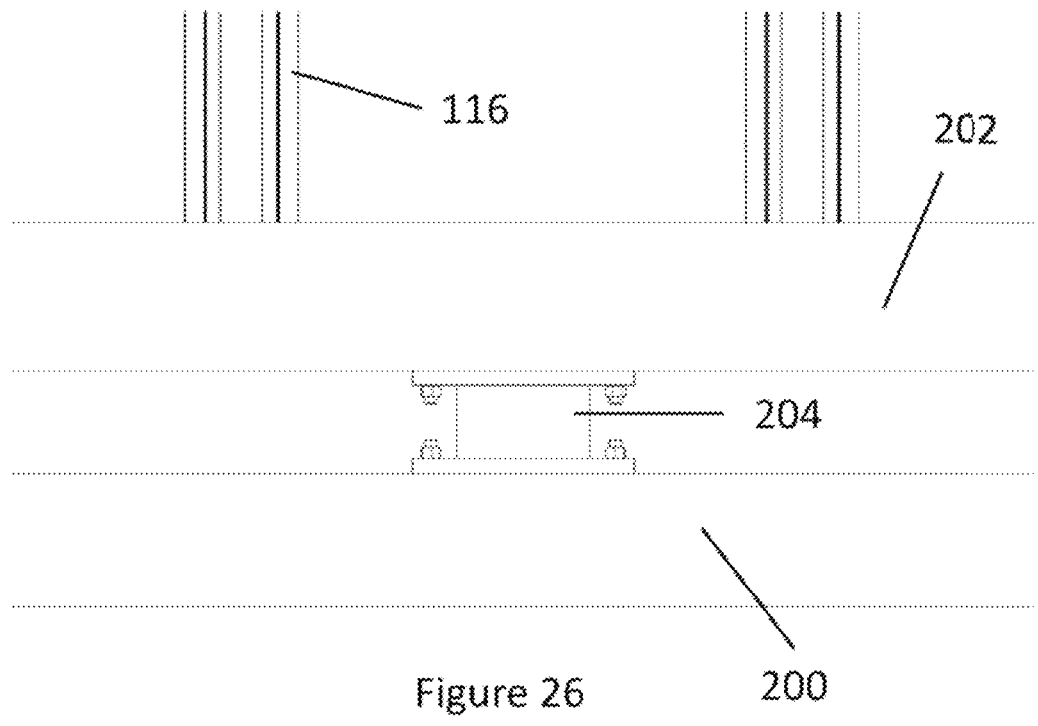
FIG. 26 is a cross sectional view of a portion of the anti-seismic isolation system showing a base isolation device according to another embodiment of the present invention.

Various other factors play a critical role in the effective isolation of the grid framework structure from seismic ground motions. These include but are not limited to the distribution and the pattern of one or more base isolation devices, the type of base isolation device, and/or the size of the base isolation device. As shown in FIG. 25, the base isolation devices are distributed in a grid like pattern between the substructure and the superstructure. Amongst other factors discussed above, the number of base isolation devices distributed between the substructure and the superstructure is also dependent on the size of the base isolation device. For example, use of larger base isolation devices 204 allows the base isolation to be spread out but requires a thicker superstructure to redistribute the concentrated forces of the weight of the storage system amongst the base isolation devices. FIG. 17 demonstrates the use of larger base isolation devices 204 each having a width in the range 400 mm to 460 mm and a height in the range 190 mm to 210 mm distributed in a 6 m×6 m grid pattern and supporting a concrete superstructure 200 mm thick. The base isolation device shown in FIG. 17 could be based on the elastomeric bearing 1204, 2204, 3204 or the Triple Pendulum™ 4204 discussed above or a combination of both bearing types. A smaller distribution of 3 m×3 m can be attained with the use of smaller base isolation devices. FIGS. 25 and 26 shows an alternative distribution of the base isolation devices 204 between the substructure and the superstructure using smaller base isolation devices having a width in the range 150 mm to 250 mm and a height in the range of 50 mm to 80 mm. Using smaller base isolation devices 204, the base isolation devices are distributed in a 3 m×3 m grid like pattern. As more base isolation devices are distributed between the substructure and the superstructure, the seismic isolation system can afford to use a thinner superstructure. In the particular embodiment shown in FIG. 25, the thickness of the concrete superstructure is about 150 mm. The distribution of the base isolation devices can be tuned to remove any irregularities or possible torsional issues in the superstructure. The large continuous grid framework structure extending over a large footprint would mean that the superstructure or diaphragm is equally continuous to accommodate the large footprint of the grid framework structure.

The constructability of the substructure can be adapted to include one or more crawl spaces or trenches to provide inspection areas for the one or more base isolation devices. For example, the substructure can comprises a plurality of pillars or plinths for mounting the one or more base isolation devices on the pillars such that the one or more base isolation devices are disposed between the pillars and the superstructure. The spaces between the pillars or plinths in the substructure provide crawl spaces.

Figure 27:
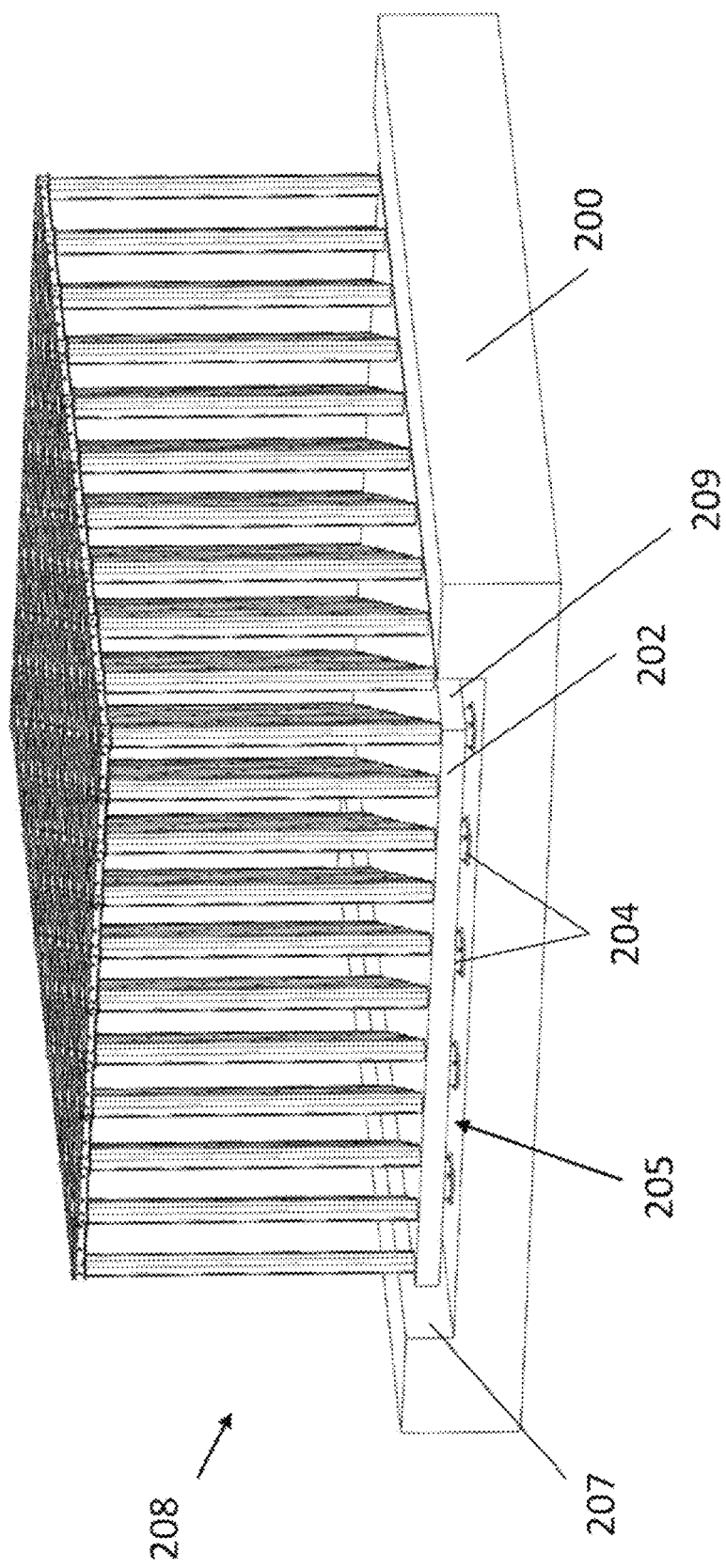
FIG. 27 is an isometric view of an alternative arrangement of the anti-seismic isolation system with one or more base isolation devices disposed in a well or a depression.

FIG. 27 is an alternative arrangement of the seismic isolation system 208 of the present invention. Here, the one or more base isolation devices 204 are disposed in a well or a depression 205 in the substructure 200 having upstanding walls 207. The superstructure 202 is mounted on the one or more base isolation devices 204 within the well such that a top wall of the superstructure 202 is level or flush with the surrounding area. The area of the depression or well is sized such that the superstructure disposed within the well is able to be displaced laterally to cater for different seismic motions. To achieve this, the spacing 206 between the edges of the superstructure and the upstanding walls 207 of the well are sized to allow lateral movement of the superstructure 202 on the one or more base isolation devices 204. Preferably, the substructure 200 is cast in place to provide a depression or well 205. The spacing 209 between the edge of the superstructure and the upstanding walls 207 of the substructure can be covered with a protective covering to improve safety. Examples of a protective covering include but are not limited to a resilient member and/or moveable slats that slide on top of each other.

Different combinations of the base isolation devices can be used to attenuate different strengths of seismic motions and providing different restoring forces. For example, an array of base isolation devices can be disposed between the superstructure and the substructure to comprise a combination or mixture of elastomeric bearings and sliding pendulum bearings.

In some embodiments of the invention, the spacing of the base isolation devices can be 10 metres. The base isolation devices can be arranged in a regular repeating pattern between the superstructure and the substructure. For example, in a regular square array or grid pattern (spacing 10 m×10 m). The isolators could also be arranged in different patterns, for example a hexagonal grid pattern, or a square grid pattern with a base isolation device in the centre of each of the squares of the square grid pattern, or any other suitable arrangement. The same pattern of base isolation devices can be used throughout the whole space between the substructure and the superstructure, or different patterns or distributions of base isolation devices can be used under different parts of the grid framework structure. Optionally, the base isolation devices can be arranged in an irregular pattern between the superstructure and the substructure, where the concentration of the base isolation devices is greater in one or more areas between the superstructure and the substructure to provide increased damping in those areas.

In embodiments where both elastomeric bearings and sliding pendulum bearings are used as base isolation devices, either the same spacing or distribution pattern can be used for both types of isolation device, or different spacing or distribution patterns can be used for the different types of base isolation devices. Different kinds of base isolation devices can be used under different parts of the grid, or the different kinds of base isolation devices may be interspersed.

The area density of base isolation devices in a regular square array at a spacing of 10 m is one per 100 square metres, or 0.01 per square metre. This density may be applied to other arrangements of base isolation devices. The area density of the base isolation devices may be in the range 0.005-0.015 devices per square metre.

The superstructure on which the grid is supported may be composed of pure concrete, or may comprise a composite steel/concrete slab. In the case where the superstructure comprises a composite steel/concrete slab, the concrete may be poured onto a steel decking, such that the concrete is cast and forms a one-piece slab with the steel decking.

The concrete used in the superstructure (whether pure concrete or composite steel/concrete) should be of a suitable quality. The concrete for the superstructure and substructure may be made to a standard specification, with a controlled mix ratio, without defects, flat, level, of a suitable concrete grade, and manufactured within specified tolerances. In some embodiments, the concrete may contain one or more additives. Additives may be used to increase the life of the concrete, control the speed of setting, control the entrainment of air, increase hardness, increase strength, reduce permeability, reduce shrinkage, reduce corrosion, or otherwise control the properties of the substructure and/or superstructure.

In some embodiments, plinths can be used to provide additional space between the substructure and the superstructure. Additional space between the substructure and superstructure can be used for a range of different functions, for example to allow space for employee car parking at a fulfilment centre. Also, the additional space provides access underneath the superstructure, so is convenient for inspection and maintenance. Plinths may be located on top of the base isolation devices, one plinth for each base isolation device. Alternatively or additionally, lower plinths may be located below and supporting the base isolation devices, one lower plinth for each base isolation device. The plinths may be steel, or concrete, or any other suitable material.

Figure 28:
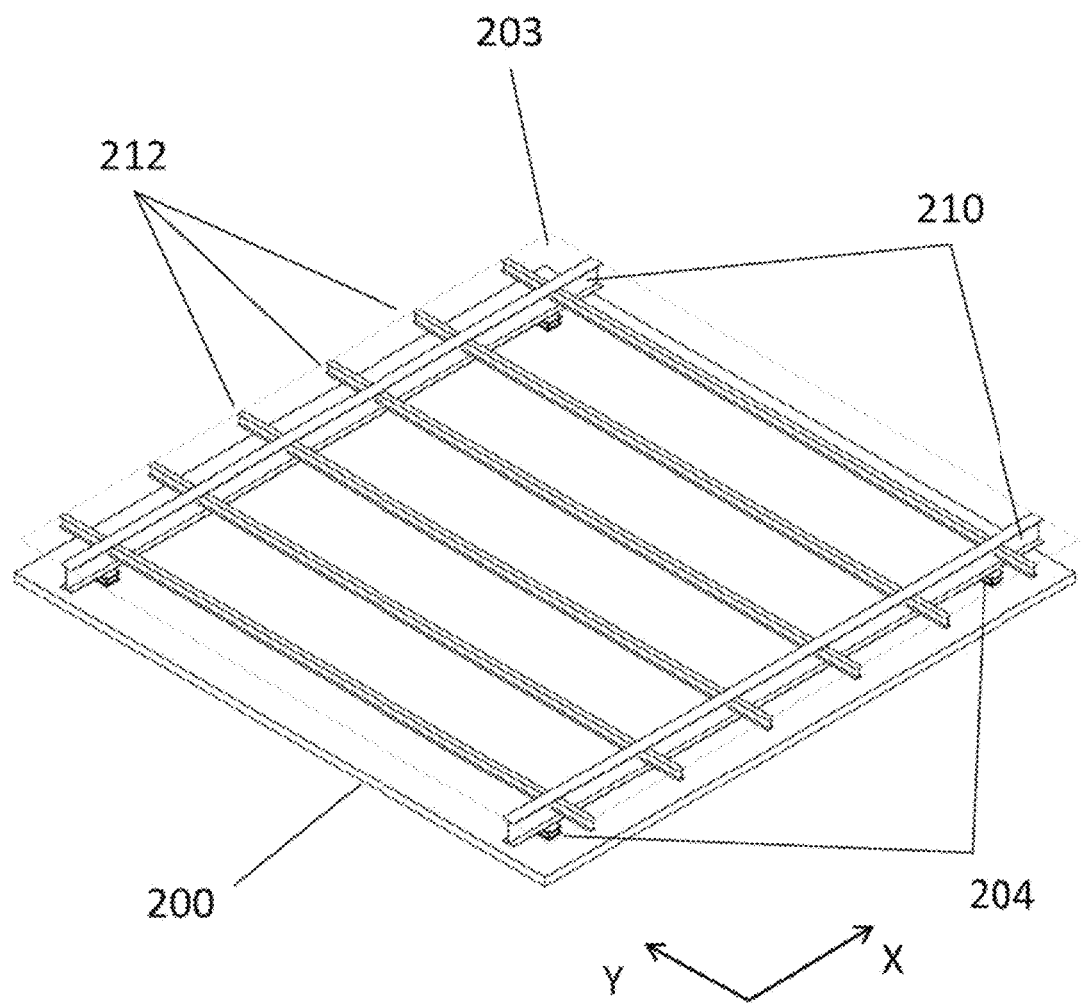
FIG. 28 is an isometric view of an alternative arrangement of a portion of the anti-seismic isolation system illustrating a plinths and a superstructure comprising supporting beams and a composite steel/concrete slab.

The superstructure may additionally comprise one or more beams, supporting a concrete or composite concrete/steel slab. FIG. 28 illustrates an exemplary embodiment of a seismic isolation system where the superstructure 202 comprises a slab 203 supported by beams 210, 212. The beams 210, 212 may be steel, and may be I-beams as illustrated in FIG. 28, or any other suitable shape. Primary beams 210 extend substantially horizontally in the first direction (x-direction), substantially perpendicular to secondary beams 212 extending substantially horizontally in the second direction (v-direction). The beams 210, 212 form a grid-like pattern in a substantially horizontal plane. Base isolation devices 204 are located between the superstructure and the substructure 200, supported by the substructure 200. The primary beams 210 are supported by the base isolation devices 204, and the secondary beams 212 are supported by the primary beams 210. The slab 203 is supported by the secondary beams 212.

In the embodiment illustrated in FIG. 28, the base isolation devices 204 are arranged in a regular square array with spacing of 10 m in both x and y directions. Four base isolation devices are shown for ease of illustration, but it will be appreciated that larger arrays of base isolation devices can be used, and may extend over a larger area. Since the primary beams 210 are supported by the base isolation devices, the spacing of the primary beams 210 in the y-direction is 10 m, the same as the spacing for the base isolation devices. The secondary beams 212 are spaced more closely together, in this case with a spacing of 2 m in the x-direction.

Figure 29:
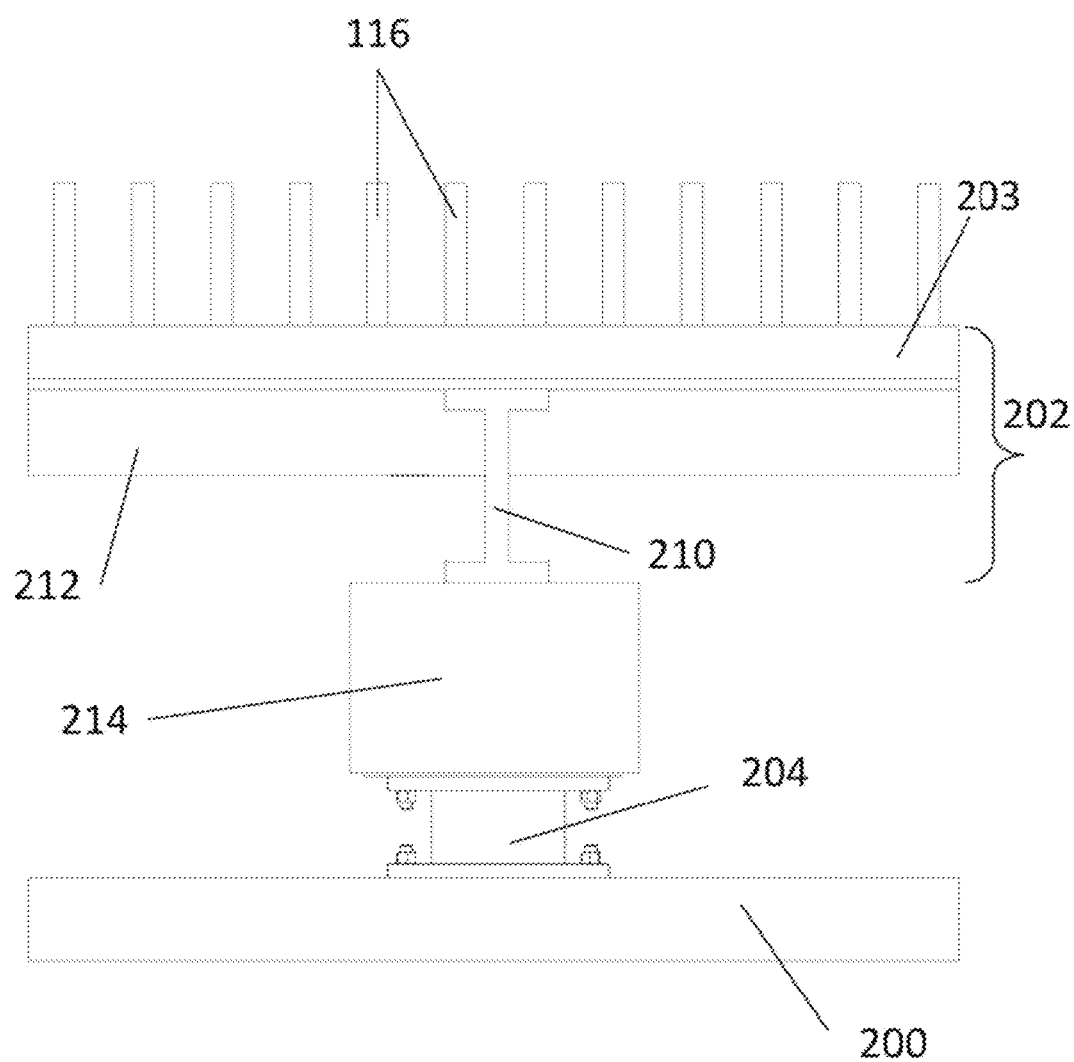
FIG. 29 is a side view of the portion of the anti-seismic isolation system of FIG. 28.

FIG. 29 illustrates the seismic isolation system of FIG. 28, as a side view, showing one base isolation device disposed between the substructure 200 and the superstructure 202 for ease of illustration. The base isolation device 204 is positioned on the substructure 200. A plinth 214 is supported by the base isolation device 204. In the particular embodiment shown in FIG. 29, the plinth 214 is shown mounted on the base isolation device 204 such that the plinth is disposed between the substructure 200 and the superstructure 202. A primary beam 210 is supported by the plinth 214 such that the plinth 214 is sandwiched between the base isolation device 204 and the primary beam 210. A secondary beam 212 is supported by the primary beam 210. The slab 203 is supported by the secondary steel beam. The upright columns 116 of the grid framework structure are supported by the slab 203. The superstructure 202 comprises the composite steel/concrete slab 203, the primary beams 210, and the secondary beams 212. In some embodiments, the seismic isolation system can include building columns 220 that provide structural support for the building housing the anti-seismic grid framework system 206, and/or pillars 222 that extend downwards below ground level. In some embodiments, in addition to the plinths 214 located between the base isolation devices 204 and the superstructure, additional plinths 216 (referred to as lower plinths 216) may be provided below the base isolation devices 204. The use of both plinths 214 and lower plinths 216 has the advantage of further increasing the available vertical space between the substructure 200 and the superstructure 202, so that this space can be used for applications such as car parking.

Figure 30:
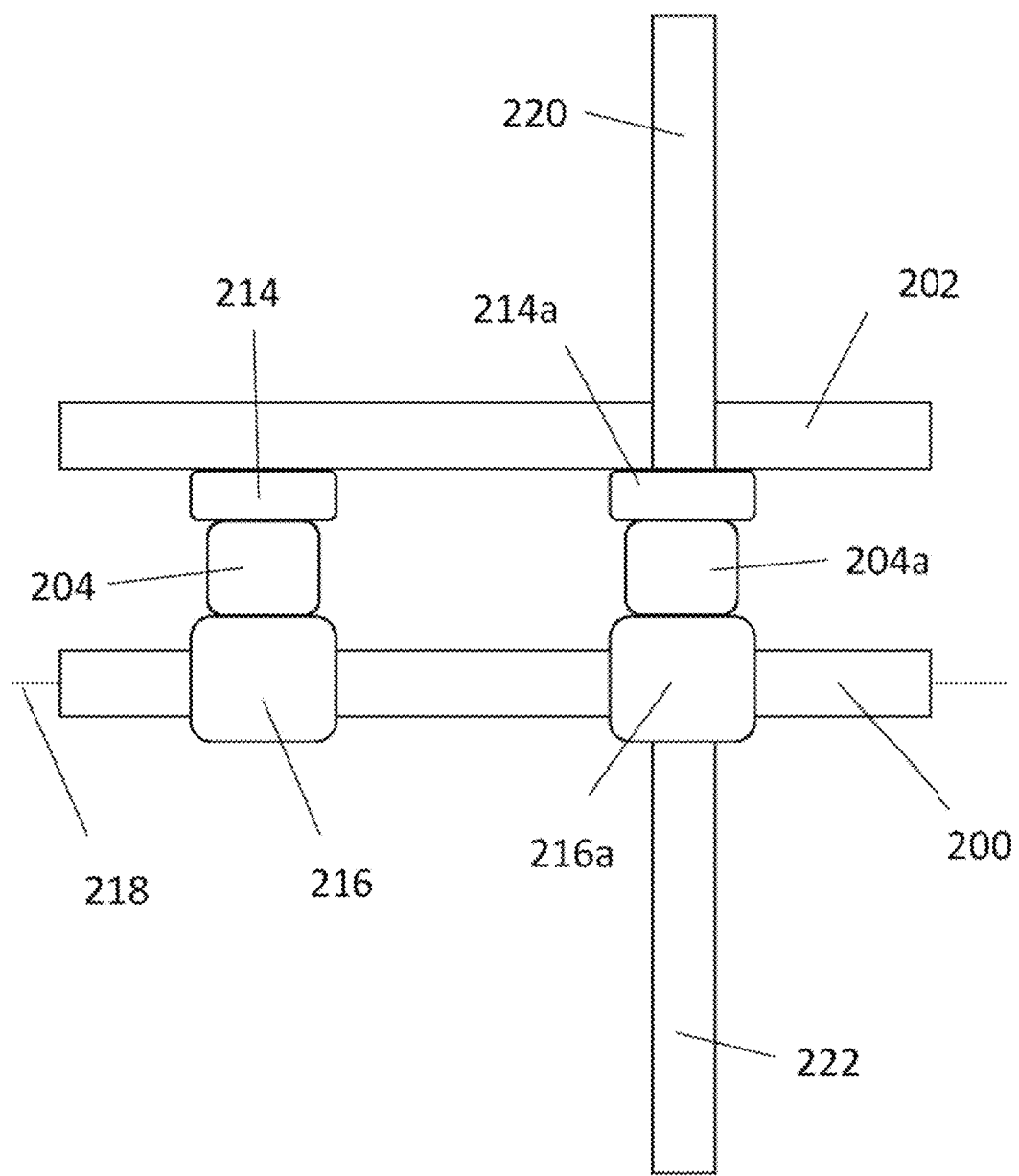
FIG. 30 is a schematic view of a portion of an anti-seismic isolation system with building columns and pillars.

FIG. 30 schematically illustrates a seismic isolation system incorporating building columns 220, pillars 222, and lower plinths 216. The substructure 200 is at ground level 218. Pillars 222 extend downwards below ground level into the earth to provide a stable foundation for the building housing the seismic isolation system. Lower plinths 216 are located at ground level, either partially within (as illustrated) or supported by the substructure 200. A subset of the lower plinths 216 are disposed above the pillars 222. Base isolation devices 204 are located on the lower plinths 216, and plinths 214 are supported by the base isolation devices 204 (so the base isolation devices 204 are located between the lower plinths 216 and the plinths 214). The superstructure 202 is supported by the plinths 214.

A subset of plinths, lower plinths, and base isolation devices support building columns 220, which extend upwards from the plinths. These plinths, lower plinths, and base isolation devices supporting the building columns 220 will be referred to with reference numbers 214a, 216a, and 204a respectively. The building columns 220 are located above the pillars 222 extending downwards into the ground, in order to withstand large compressive loads and support the weight of the building structure above. The building columns 220 are supported by plinths 214a. The plinths 214a are supported by base isolation devices 204a. The base isolation devices 204a are supported by lower plinths 216a, which are located above and supported by the pillars 222.

The subset of base isolation devices 204a which are located above the pillars 222 and below the building columns 220 may be sliding pendulum bearings. Sliding pendulum bearings can withstand high compressive loads, so are suitable for use in this location. In embodiments where a combination of sliding pendulum bearings and elastomeric bearings are used, the subset of base isolation devices 204a which are located above the pillars 222 and below the building columns 220 may be sliding pendulum bearings, and the other base isolation devices 204 may be elastomeric bearings.

Figure 31:
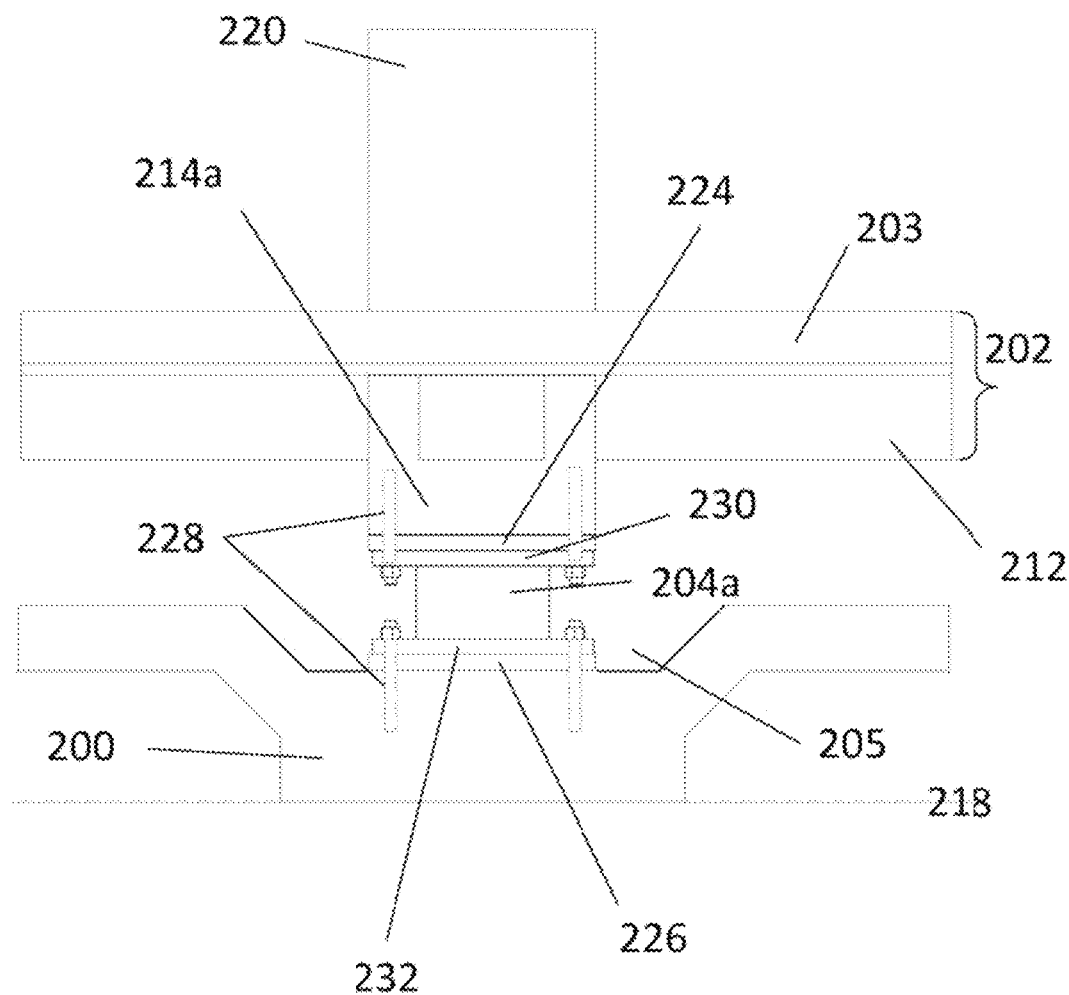
FIG. 31 is a schematic view of a portion of an anti-seismic isolation system with building columns.

FIG. 31 schematically illustrates a base isolation device 204a supporting a building column 220. The substructure 200 is shaped such that the base isolation device 204a is located in a well or depression 205. The base isolation device 204a comprises a top isolator plate 230 and a bottom isolator plate 232. In applications where the base isolation device 204a is an elastomeric bearing, the upper mounting plate 1210a and lower mounting plate 1210b may be the same as the top and bottom isolator plates 230, 232 respectively. The bottom isolator plate 232 of the base isolation device 204a is mounted on a base plate 226, which is mounted on the substructure 200 by anchor bolts 228. A plinth 214a is supported by the base isolation device 204a, with a plinth base plate 230 mounted to its underside. The plinth base plate is mounted directly on top of the top isolator plate 230 of the base isolation device 204a. The plinth 214a supports the superstructure 202. In the embodiment illustrated in FIG. 31, the superstructure 202 comprises beams 212 supporting a slab 203, with the beams 212 being supported by the plinth 214a.

Definitions

In this document, the language "movement in the n-direction" (and related wording), where n is one of x, y and z, is intended to mean movement substantially along or parallel to the n-axis, in either direction (i.e. towards the positive end of the n-axis or towards the negative end of the n-axis).

In this document, the word "connect" and its derivatives are intended to include the 25 possibilities of direct and indirection connection. For example, "x is connected to y" is intended to include the possibility that x is directly connected to y, with no intervening components, and the possibility that x is indirectly connected to y, with one or more intervening components. Where a direct connection is intended, the words "directly connected", "direct connection" or similar will be used. Similarly, the word "support" 30 and its derivatives are intended to include the possibilities of direct and indirect contact.

For example, "x supports y" is intended to include the possibility that x directly supports and directly contacts y, with no intervening components, and the possibility that x indirectly supports y, with one or more intervening components contacting x and/or y. The word "mount" and its derivatives are intended to include the possibility of direct and indirect mounting. For example, "x is mounted on y" is intended to include the 5 possibility that x is directly mounted on y, with no intervening components, and the possibility that x is indirectly mounted on y, with one or more intervening components.

In this document, the word "comprise" and its derivatives are intended to have an inclusive rather than an exclusive meaning. For example, "x comprises y" is intended to include the possibilities that x includes one and only one y, multiple y's, or one or 10 more y's and one or more other elements. Where an exclusive meaning is intended, the language "x is composed of y" will be used, meaning that x includes only y and nothing else.

The invention claimed is:

1. A storage system comprising:
a) an anti-seismic grid framework system comprising:
a grid framework structure configured for supporting a load handling device operative to move one or more containers in a stack;
a series of intersecting grid members arranged to form a grid including a plurality of substantially rectangular frames in a horizontal plane, each of the substantially rectangular frames constituting a grid cell, said grid being supported by a plurality of upright columns at each of the intersections of the series of grid members to form a plurality of vertical storage locations for containers to be stacked between the upright columns and be guided by the upright columns in a vertical direction through the plurality of substantially rectangular frames; and
a seismic isolation system for reducing seismic forces acting on the grid framework structure, wherein the grid framework structure is supported by the seismic isolation system, the seismic isolation system including a superstructure and a substructure, and at least one base isolation device disposed between the superstructure and the substructure such that the at least one base isolation device suppresses movement of the superstructure relative to the substructure in a seismic event;

b) said one or more containers, each of the one or more containers positioned in the stack; and c) one or more said load handling devices remotely operated to move the one or more containers stored in the grid framework structure, each of the one or more load handling devices including:

i) a wheel assembly for guiding the load handling device on the grid framework structure;

ii) a container-receiving space located above the grid framework structure; and iii) a lifting device arranged to lift a single container of the one or more containers from the stack into the container-receiving space.

2. The system of claim 1, wherein the superstructure comprises:
a load bearing structure of the grid framework structure.

3. The system of claim 1, wherein the substructure comprises:
a foundation of the grid framework structure.

4. The system of claim 1, wherein the at least one base isolation device is disposed in a well.

5. The system of claim 1, wherein the at least one base isolation device comprises:
a plurality of base isolation devices disposed between the superstructure and the substructure, and said plurality of base isolation devices are spaced apart in an array or grid-shaped pattern of X metres by X metres, and wherein X is in a range between 1 m to 15 m.

6. The system of claim 1, wherein a width of the at least one base isolation device is in a range of about 150 mm to about 500 mm.

7. The system of claim 1, wherein a width of the at least one base isolation device is in a range of about 900 mm to about 1200 mm.

8. The system of claim 1, wherein the at least one base isolation device has a height in a range of about 50 mm to about 250 mm.

9. The system of claim 1, wherein the at least one base isolation device has a height in a range of about 320 mm to about 350 mm.

10. The system of claim 1, wherein the at least one base isolation device comprises:
a plurality of base isolation devices disposed between the superstructure and the substructure, and an area density of the plurality of base isolation devices is in a range of about 0.005 to about 0.015 devices per square metre.

11. The system of claim 1, wherein the superstructure comprises:
a slab supported by one or more substantially horizontal beams.

12. The system of claim 1, wherein the superstructure comprises a slab supported by one or more substantially horizontal beams, and wherein the slab comprises:
a composite slab comprised of steel and concrete.

13. The system of claim 1, wherein the seismic isolation system comprises:
one or more plinths at least one of (i) disposed between the at least one base isolation device and the superstructure or (ii) disposed between the substructure and the at least one base isolation device, such that a vertical distance between the substructure and the superstructure is increased.

14. The system of claim 1, wherein each of the one or more containers includes one or more items therein.

15. The system of claim 1, wherein the at least one base isolation device comprises:
an elastomeric bearing including a laminated assembly of alternating elastomeric layers and rigid layers disposed between an upper mounting plate and a lower mounting plate for respectively connecting to the superstructure and the substructure.

16. The system of claim 15, wherein each of the elastomeric layers comprises:
rubber, and each of the rigid layers comprises:
steel, such that the elastomeric bearing includes a respective said laminated assembly of alternating rubber layers and steel layers.

17. The system of claim 1, wherein the at least one base isolation device comprises:
an elastomeric bearing including a laminated assembly of elastomeric layers, said laminated assembly being disposed between an upper mounting plate and a lower mounting plate for respectively connecting to the superstructure and the substructure.

18. The system of claim 17, wherein the upper mounting plate is joined to an upper connection plate and the lower mounting plate is joined to a lower connection plate such that the laminated assembly is sandwiched between the upper connection plate and the lower connection plate.

19. The system of claim 17, wherein the elastomeric bearing comprises:
an energy dissipating core disposed within an interior of the laminated assembly, said energy dissipating core being configured to damp vibration in a shearing direction of the laminated assembly by absorbing vibrational energy in the shearing direction of said laminated assembly; and
wherein outer peripheral surfaces of the elastomeric layers and rigid layers are enclosed in a flexible support body.

20. The system of claim 19, wherein the energy dissipating core comprises:
at least one or more of lead, tin, zinc, aluminum, copper, nickel, or an alloy thereof.

21. The system of claim 17, wherein the elastomeric bearing comprises:
a slider disc disposed between the laminated assembly and either the upper mounting plate or the lower mounting plate.

22. The system of claim 21, wherein the slider disc comprises:
PTFE.

23. The system of claim 1, wherein the at least one base isolation device comprises:
a sliding pendulum bearing which includes:

i) an upper bearing element having a first sliding surface;

ii) a lower bearing element having a second sliding surface; and iii) a slider disposed between the upper bearing element and the lower bearing element such the slider is arranged to be in surface contact with the first sliding surface and the second sliding surface, at least one of the first sliding surface or the second sliding surface having a concave spherical surface with a specified radius of curvature such that the slider is arranged to slide along the concave spherical surface of at least one of the first sliding surface or the second sliding surface resulting in a lifting of the superstructure during seismic ground motion consistent with providing at least one sliding pendulum mechanism.

24. The system of claim 23, wherein the upper bearing element is fixed to the superstructure and the lower bearing element is fixed to the substructure.

25. The system of claim 1, wherein the at least one base isolation device comprises:
a triple pendulum bearing including:
i) an upper bearing element having a downward facing concave spherical surface with a specified radius of curvature;
ii) a lower bearing element having an upward facing concave spherical surface with a specified radius of curvature;
iii) a first slider having a convex spherical surface that is arranged to slide along the upward facing concave spherical surface of the lower bearing element and an opposing concave spherical surface having a radius substantially smaller than the radius of curvature of the upward facing concave spherical surface of the lower bearing element;
iv) a second slider having a convex spherical surface that is arranged to slide along the downward facing concave spherical surface of the upper bearing element and an opposing concave spherical surface having a radius substantially smaller than the radius of curvature of the downward facing concave spherical surface of the upper bearing element; and
v) a third slider having a lower convex spherical surface that is arranged to slide along the concave spherical surface of the first slider, and an upper convex spherical surface that is arranged to slide along the concave spherical surface of the second slider.

26. The system of claim 25, wherein the first slider and the second slider are connected together by a perimeter seal.

27. The system of claim 25, wherein the triple pendulum bearing comprises:
a means of connecting the first and second sliders together so as to allow independent pendulum mechanisms to be achieved from the sliding of said first slider against the lower bearing element and the sliding of the second slider against the upper bearing element.

28. The system of claim 25, wherein a respective sliding surface between the first slider and the lower bearing element has a first coefficient of friction and a respective sliding surface between the second slider and the upper bearing element has a second coefficient of friction, and wherein the first coefficient of friction is different than the second coefficient of friction.

29. The system of claim 28, wherein a respective sliding surface between the third slider and the first slider has a third coefficient of friction and a respective sliding surface between the third slider and the second slider has a fourth coefficient of friction, and wherein the third coefficient of friction is substantially equal or different than the fourth coefficient of friction.

30. The system of claim 29, wherein the third coefficient of friction is less than both of the first coefficient of friction and the second coefficient of friction, and the fourth coefficient of friction is less than both of the first coefficient of friction and the second coefficient of friction.

* * * * *